US008649672B2

(12) United States Patent
Takizawa

(10) Patent No.: US 8,649,672 B2
(45) Date of Patent: Feb. 11, 2014

(54) CAMERA DRIVE DEVICE

(75) Inventor: Teruyuki Takizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 13/392,150

(22) PCT Filed: Jun. 7, 2011

(86) PCT No.: PCT/JP2011/003189
§ 371 (c)(1),
(2), (4) Date: Feb. 24, 2012

(87) PCT Pub. No.: WO2011/155178
PCT Pub. Date: Dec. 15, 2011

(65) Prior Publication Data
US 2012/0155843 A1 Jun. 21, 2012

(30) Foreign Application Priority Data
Jun. 9, 2010 (JP) ................................. 2010-132313

(51) Int. Cl.
*G03B 17/00* (2006.01)
(52) U.S. Cl.
USPC ............................................................ 396/55
(58) Field of Classification Search
USPC .................. 396/15, 53, 55, 421; 348/208.99, 348/208.4–208.11; 359/554–557
See application file for complete search history.

(56) References Cited

U.S. PATENT DOCUMENTS

| 5,956,529 A | 9/1999 | Lee et al. ......................... 396/55 |
| 2006/0033818 A1 | 2/2006 | Wada et al. ............... 348/208.11 |
| 2010/0202766 A1* | 8/2010 | Takizawa et al. ................ 396/55 |
| 2011/0122495 A1 | 5/2011 | Togashi ........................ 359/557 |

FOREIGN PATENT DOCUMENTS

| JP | 11-220651 A | 8/1999 |
| JP | 2006-053358 A | 2/2006 |
| JP | 2008-058391 A | 3/2008 |
| JP | 2010-096861 A | 4/2010 |
| WO | 2010/010712 A1 | 1/2010 |

OTHER PUBLICATIONS

Co-pending U.S. Appl. No. 13/498,940, filed Mar. 29, 2012.
International Search Report for corresponding International Application No. PCT/JP2011/003189 mailed Jul. 19, 2011.
Form PCT/ISA/237 for corresponding International Application No. PCT/JP2011/003189 dated Jul. 19, 2011 and Partial English translation.

\* cited by examiner

*Primary Examiner* — Clayton E Laballe
*Assistant Examiner* — Warren K Fenwick
(74) *Attorney, Agent, or Firm* — Renner, Otto, Boisselle & Sklar, LLP

(57) ABSTRACT

A camera driving apparatus according to the present invention includes a camera section; a fixed unit including a protrusion section formed of a magnetic member at least partially and having a shape of at least a part of a spherical face; a movable unit for supporting the camera section, and a conical contact face with which the protrusion section of the fixed unit is loosely engageable and contactable by the magnetic attracting force, the movable unit being freely pivotable with respect to a sphere center of the spherical face of the protrusion section; and a fall preventive member including a fall preventive regulation section distanced from the movable unit by a prescribed gap in a direction of the optical axis, the fall preventive member being fixed to the fixed unit.

20 Claims, 15 Drawing Sheets

CAMERA DRIVE DEVICE

TECHNICAL FIELD

The present invention relates to a camera driving apparatus capable of inclining a camera section including an imaging element in a panning (yawing) direction and a tilting (pitching) direction and also capable of rotating (rolling) the camera section around an optical axis of the lens.

BACKGROUND ART

Many of video cameras and digital cameras recently on the market include a camera-shake compensation device for compensating for image blurring of a photo caused by camera-shake. The camera-shake compensation device inclines a lens, a lens barrel, a reflective mirror, an imaging element or the like with respect to an optical axis of the camera, or moves such an element on a plane perpendicular to the optical axis two-dimensionally.

For example, Patent Document 1 discloses a shake compensation mechanism having a structure which elastically supports the lens barrel at one point and inclines the lens barrel with respect to the optical axis. Patent Document 2 discloses a camera-shake compensation device which supports the mirror with a pivot structure and inclines the mirror with respect to the optical axis. Patent Document 3 discloses an imaging lens unit which supports a spherical lens barrel at three points and inclines the lens barrel while moving the lens barrel along the optical axis.

CITATION LIST

Patent Literature

Patent Document 1: Japanese Laid-Open Patent Publication No. 2006-53358
Patent Document 2: Japanese Laid-Open Patent Publication No. 11-220651
Patent Document 3: Japanese Laid-Open Patent Publication No. 2008-58391

SUMMARY OF INVENTION

Technical Problem

It is generally considered that the camera-shake angle caused when a person takes an image while being still is about ±0.3 degrees and that the generated frequency component is about 20 to 30 Hz. It is also considered that the camera-shake compensation needs to be controlled in a frequency band of about 10 Hz.

As is understood, when a photographer takes an image using a video camera or a digital camera while being still, the camera-shake angle is relatively small and the frequency for the control is relatively low. Owing to this, a conventional camera driving apparatus for compensating for image blurring of a photo caused by the camera-shake while the photographer is in a still state realizes good camera-shake compensation, despite that the angle at which each of sections of the camera driving apparatus (lens, lens barrel, reflective mirror, imaging element, etc.) with respect to the optical axis of the lens is to be inclined or the amount by which such an element is to be moved straight on a plane perpendicular to the optical axis two-dimensionally is very small.

However, when the photographer takes a moving picture or a still picture while walking, the angle of a shake of an image (hereinafter, occasionally referred to as "walk-shake"; walk-shake encompasses camera-shake) is, for example, ±10 degrees or greater. It is considered that the walk-shake compensation needs to be controlled in a frequency band of about 50 Hz.

When the angle of the shake of the image is larger and the compensation needs to be controlled at a higher frequency, the conventional camera driving apparatus has a problem in the structure of a support system for supporting the elements and a driving system for driving the elements.

For example, the device in Patent Document 1 is suitable for inclining the lens barrel at a very small angle. However, for inclining the lens barrel at a large angle exceeding ±10 degrees, an elastic body which supports the device is considered to be deformed to the level of plasticity. When the angle at which the lens barrel is inclined becomes large, the load caused by the spring constant of the elastic body becomes excessively large, and the amplitude increase coefficient (Q factor) of inherent vibration by the elastic body is also increased. It is considered that as a result, the phase characteristic and the gain characteristic of the compensation control are declined, and so it becomes difficult to control the compensation in the above-described frequency band.

The device in Patent Document 2 drives the reflective mirror in order to compensate for the shake of the image. However, where a video camera or a digital camera includes a wide-angle lens system, a reflective mirror provided in the optical system cannot avoid becoming large. Therefore, the reflective mirror cannot be considered to be a solution suitable for a video camera or a digital camera which is desired to be compact. In addition, the mirror is supported with a pivot structure using a magnetic attracting force, and so the mirror may fall due to an external disturbance such as vibration, impact or the like.

The lens unit in Patent Document 3 includes a spherical lens holder, and so can incline the lens holder at a large angle. However, the rotating radius of a part along which the lens holder contacts a holder provided outer to the lens holder is large. Therefore, the frictional load on the movable section is large, and so the moving distance by motion is long. For this reason, it is considered that when the inclining angle becomes large, the contact frictional load changes much, which makes it difficult to provide accurate control. Unless the gap between the lens holder and the holder provided outer thereto is controlled accurately, it is difficult to accurately control the inclining angle of the lens holder. Depending on the processing precision of these components, a mechanical looseness may occur, which may hinder the frequency response characteristic of the movable section.

None of the devices in Patent Documents 1 through 3 has a structure for rotating the element such as a lens or the like around the optical axis of the camera section.

In order to solve at least one of these problems of the conventional art, the present inventors conceived a novel structure for supporting the camera section such that the camera section is rotatable in three axial directions.

The present invention has an object of solving at least one of these problems of the conventional art and realizing a camera driving apparatus capable of rotating a camera section in three axial directions.

Solution to Problem

A camera driving apparatus according to the present invention includes a camera section including an imaging element having an imaging plane, a lens having an optical axis for forming an image of a subject on the imaging plane, and a lens barrel for holding the lens; a fixed unit including a protrusion section formed of a magnetic member at least partially and having a shape of at least a part of a spherical face; a movable unit for supporting the camera section, the movable unit including an attracting magnet for generating a magnetic attracting force for the magnetic member, and a conical contact face with which the protrusion section of the fixed unit is loosely engageable and contactable by the magnetic attracting force, the movable unit being freely pivotable with respect to a sphere center of the spherical face of the protrusion section; a panning driving section for inclining the camera section with respect to the fixed unit in a panning direction; a tilting driving section for inclining the camera section with respect to the fixed unit in a tilting direction which is perpendicular to the panning direction; a rolling driving section for rotating the camera section with respect to the fixed unit in a rolling direction around the optical axis of the lens; a detector for detecting an inclining angle of the camera section with respect to the fixed unit in the panning and tilting directions and a rotating angle of the camera section in the rolling direction; and a fall preventive member including a fall preventive regulation section distanced from the movable unit by a prescribed gap in a direction of the optical axis, the fall preventive member being fixed to the fixed unit.

In a preferable embodiment, the fall preventive member includes four fall preventive regulation sections; the four fall preventive regulation sections are provided in the form of two pairs; and the two pairs of fall preventive regulation sections are respectively located on two straight lines which are perpendicular to each other and have an angle of 45 degrees with respect to a rotation axis of inclination around which the movable unit is inclined in the panning direction and a rotation axis of inclination around which the movable unit is inclined in the tilting direction.

In a preferable embodiment, the panning driving section includes a pair of panning driving magnets located symmetrically with respect to the sphere center of the spherical face and fixed to the fixed unit; and a pair of panning driving coils provided on the movable unit so as to respectively face the panning driving magnets. The tilting driving section includes a pair of tilting driving magnets located symmetrically with respect to the sphere center of the spherical face and fixed to the fixed unit so as to be respectively perpendicular to the pair of panning driving magnets; and a pair of tilting driving coils provided on the movable unit so as to respectively face the tilting driving magnets. A position of each of the panning driving magnets, the tilting driving magnets, the panning driving coils and the tilting driving coils in the direction of the optical axis approximately matches a position of the sphere center of the spherical face.

In a preferable embodiment, the panning driving section includes a pair of panning magnetic yokes provided on the movable unit, inner to the pair of panning driving coils; and the tilting driving section includes a pair of tilting magnetic yokes provided on the movable unit, inner to the pair of tilting driving coils.

In a preferable embodiment, the rolling driving section includes four rolling driving coils; each of the rolling driving coils is located so as to bridge a side face, of one of the panning driving coils, which faces the corresponding panning driving magnet and a side face, of one of the tilting driving coils, which faces the corresponding tilting driving magnet and also so as to overlap a part of the one of the panning driving coils and a part of the one of the tilting driving coils; and the rolling driving section includes the four rolling driving coils, the panning driving magnets and the tilting driving magnets.

In a preferable embodiment, the panning magnetic yokes and the tilting magnetic yokes each act also as a rolling magnetic yoke.

In a preferable embodiment, the pair of panning driving magnets are magnetized oppositely to each other on a straight line which is on a plane perpendicular to the optical axis of the lens and passes the sphere center; the pair of tilting driving magnets are magnetized oppositely to each other on a straight line which is on a plane perpendicular to the optical axis of the lens and passes the sphere center; and each one of the panning driving magnets and each one of the tilting driving magnets, which are adjacent to each other at an interval of 90 degrees, are magnetized oppositely to each other with respect to the sphere center on a circumference of a circle which is on a plane perpendicular to the optical axis and is centered around a point at which the optical axis crosses the plane.

In a preferable embodiment, each of the panning driving coils and a corresponding one of the tilting driving coils are symmetrical with respect to a plane which is perpendicular to the optical axis of the lens and includes the sphere center; the panning driving coils and the tilting driving coils each have a generally V-shaped cross-section on a plane including the optical axis; and the panning driving coils and the tilting driving coils are each located such that a trough portion of the V-shaped cross-section faces the optical axis.

In a preferable embodiment, the pair of panning driving magnets and the pair of tilting driving magnets each have a side face which has a shape of a part of a recessed spherical face having a center matching the sphere center of the spherical face.

In a preferable embodiment, the detector includes a first detection section for detecting an inclining angle of the camera section with respect to the fixed unit in the panning and tilting directions, and second detection sections for detecting a rotating angle of the camera section in the rolling direction.

In a preferable embodiment, the first detection section includes a first magnetic sensor fixed to the fixed unit; and the first magnetic sensor detects a change of a magnetic force caused by inclination of the attracting magnet provided in the movable unit and calculates a two-dimensional inclining angle of the camera section in the panning and tilting directions.

In a preferable embodiment, the first magnetic sensor is provided at a tip of, or inside, the protrusion section of the fixed unit.

In a preferable embodiment, the second detection sections are located symmetrically with respect to the sphere center on a plane which is perpendicular to the optical axis of the lens and passes the sphere center; and the second detection sections are located at an angle of 45 degrees with respect to the panning driving section or the tilting driving section when seen in the direction of the optical axis of the lens in the case where the movable unit is at a neutral position.

In a preferable embodiment, the second detection sections include a pair of second magnetic sensors fixed to the fixed unit and a pair of rotation detection magnets provided on the movable unit; and the pair of second magnetic sensors detect a change of a magnetic force caused by rotation of the rotation detection magnets and calculate a rotating angle of the camera section.

In a preferable embodiment, the pair of second magnetic sensors are located symmetrically with respect to the sphere center on a straight line which is on a plane perpendicular to the optical axis of the lens and passes the sphere center, and the pair of rotation detection magnets are located symmetrically with respect to the sphere center on a straight line which is on a plane perpendicular to the optical axis of the lens and passes the sphere center.

In a preferable embodiment, the pair of rotation detection magnets each include two magnetic poles, magnetized oppositely to each other, on a straight line which is on a plane perpendicular to the optical axis of the lens and passes the sphere center, and the two magnetic poles are located on a circumference of a circle centered around the optical axis on the plane perpendicular to the optical axis of the lens.

In a preferable embodiment, the pair of second magnetic sensors are provided on the protrusion section of the fixed unit.

In a preferable embodiment, the camera driving apparatus further includes a viscous member or a viscous fluid provided between the contact face of the movable unit and the protrusion section of the fixed unit.

In a preferable embodiment, the attracting magnet is located on the optical axis of the lens in the movable unit and is magnetized in the direction of the optical axis.

In a preferable embodiment, the gap is determined such that the contact face of the movable unit, even when being separated from the protrusion section of the fixed unit, is returned to a contact state by the magnetic attracting force of the attracting magnet.

A camera unit according to the present invention includes the camera driving apparatus defined by any of the above; angular velocity sensors respectively for detecting angular velocities around three axes of the fixed unit which are perpendicular to one another; and a calculation processing section for generating a target rotation angle signal based on outputs from the angular velocity sensors, and a driving circuit for generating a signal for driving the panning driving section and the tilting driving section based on the target rotation angle signal.

Advantageous Effects of Invention

In a camera driving apparatus according to the present invention, a pivot supporting structure is formed of a contact face provided on the movable unit and defining a conical shape and a protrusion section formed of a magnetic member at least partially and having a shape of at least a part of a spherical face. Therefore, the movable unit can be freely rotated around a sphere center of the spherical face with respect to the fixed unit. The protrusion section is kept in a state of contacting the contact face by a magnetic attracting force of the attracting magnet, and therefore the load on the pivot support can be kept constant regardless of the rotation state of the movable unit. Even if the movable unit receives an external impact, the fall preventive regulation sections prevent the movable unit from falling and allows the movable unit to return to a state where the movable unit is in contact with the contact face.

The pivot supporting structure can allow the movable unit to be supported at the center of gravity, and therefore the mechanical resonance in the control frequency band can be significantly suppressed.

A magnetic attracting force which is unlikely to influence the pivoting angle provides a constant vertical drag to a pivot structure formed of the protrusion section and the contact face of the movable unit. Therefore, a fluctuation of the frictional load in accordance with the pivoting angle is reduced, and a good phase characteristic and a good gain characteristic can be realized in the control driving frequency band.

Since the fall preventive regulation sections are provided in the fall preventive member fixed to the fixed unit, the work of assembling the movable unit to the fixed unit is made easier and thus the ease of assembly can be significantly improved.

A specific embodiment of the present invention provides the following effects. Specifically, the driving sections for driving in the panning, tilting and rolling directions include two pairs of driving coils perpendicular to each other which are located on a circumference of a circle centered around the optical axis and are fixed to the movable unit, and two pairs of driving magnets provided on the fixed unit so as to face the driving coils, and the height position of these components in the direction of the optical axis is approximately equal to the height position of the sphere center of the protrusion section. Owing to this, the movable unit can be driven as being centered around the center of gravity, and the mechanical resonance in the control driving frequency band can be significantly suppressed.

A moving coil driving structure having the driving coils mounted on the movable unit is realized. Therefore, the mass of the movable unit can be reduced and the driving efficiency can be improved.

The moving coil driving structure, when not being electrified, does not cause a magnetic force, which would otherwise act as an external disturbance on the movable unit. Therefore, good controllability can be provided with certainty.

A viscous member or a viscous fluid for attenuating the vibration is provided in a generally ring-like space defined by the conical contact face and the protrusion section loosely engaged with the conical contact face. Therefore, the amplitude increase coefficient (Q factor) caused by a magnetic spring effect, which is provided by the magnetic attracting force generated between the magnetic yokes mounted on the movable unit and the driving magnets provided on the fixed unit, can be decreased. The Q factor of the inherent mechanical vibration can be also decreased. Thus, a good control characteristic can be provided.

The movable unit having a central axis of the conical contact face and an attracting magnet on a line extended from the optical axis, and the magnetic sensor provided on the fixed unit so as to face the attracting magnet, detect a change of the magnetic force of the attracting magnet caused by inclination and rotation of the movable unit and calculate the inclining angle and the rotating angle. Therefore, the attracting magnet is usable as an angle detection magnet in addition to achieving the original purpose of providing a vertical drag to the supporting system. Thus, the number of components of the apparatus can be decreased and the apparatus can be reduced in size.

Rotation detection means has two rotation detection magnets which are magnetized in a direction perpendicular to the optical axis. The two rotation detection magnets each have two magnetic poles. The two magnetic poles of one of the two rotation detection magnets are arranged in an opposite direction to the two magnetic poles of the other rotation detection magnet in the rolling direction around the optical axis. These rotation detection magnets are provided on the movable unit and located symmetrically with respect to the sphere center, on a straight line which is perpendicular to the optical axis and passes the sphere center of the protrusion section. The rotation detection means also include two magnetic sensors corresponding to the rotation detection magnets. The two magnetic sensors respectively detect a change of the magnetic force of the rotation detection magnets. Such rotation detection means can cancel the crosstalk output which is generated when the movable unit is pivoted in the panning and tilting directions, and thus only the angle in the rolling direction can be extracted and detected in the range in which the movable unit can be pivoted.

The rotation angle detection means is provided at an angle of 45 degrees with respect to inclination or rotation driving means as seen in the direction of the optical axis. The driving means is provided on a circumference of a circle having a large radius centered around the optical axis to improve the driving moment, and the rotation angle detection means is provided on a circumference of a circle having a small radius centered around the optical axis to shorten the rotation detection distance and reduce the size of the rotation detection magnets and the magnetic sensors. Thus, the apparatus can be reduced in size.

As described above, the present invention can realize good shake compensation control in a wide frequency band of up to about 50 Hz by use of a driving supporting system which is capable of realizing inclination driving in the panning direction and the tilting direction and also capable of realizing rotation driving in the rolling direction, both at a large angle of ±10 degrees or greater. Thus, a compact and solid camera driving apparatus capable of compensating for image blurring of a photo taken while the photographer is walking can be provided.

DESCRIPTION OF EMBODIMENTS (Embodiment 1)

Figure 1:
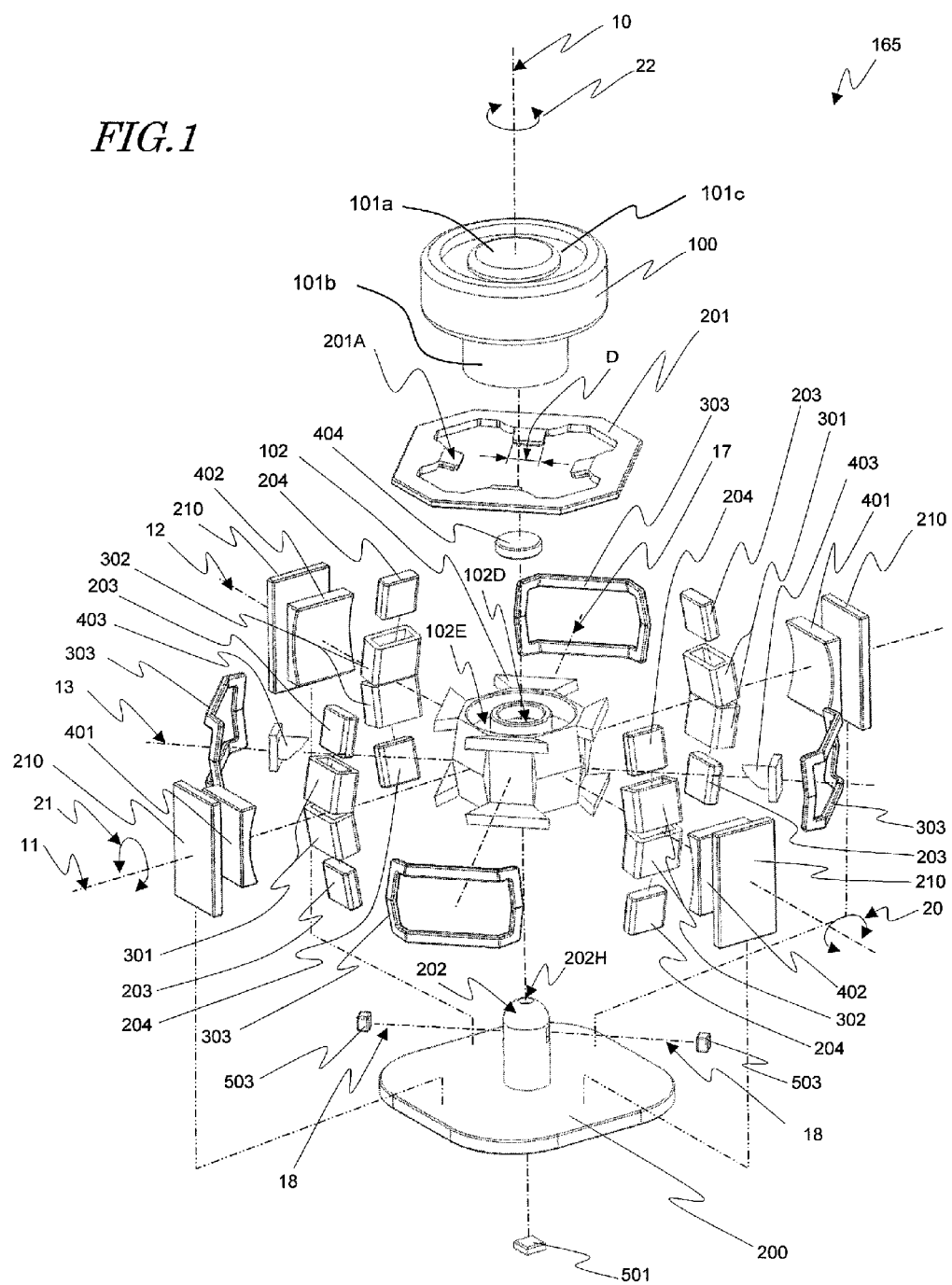
FIG. 1 is an exploded isometric view of a camera driving apparatus in an embodiment according to the present invention.
Figure 2:
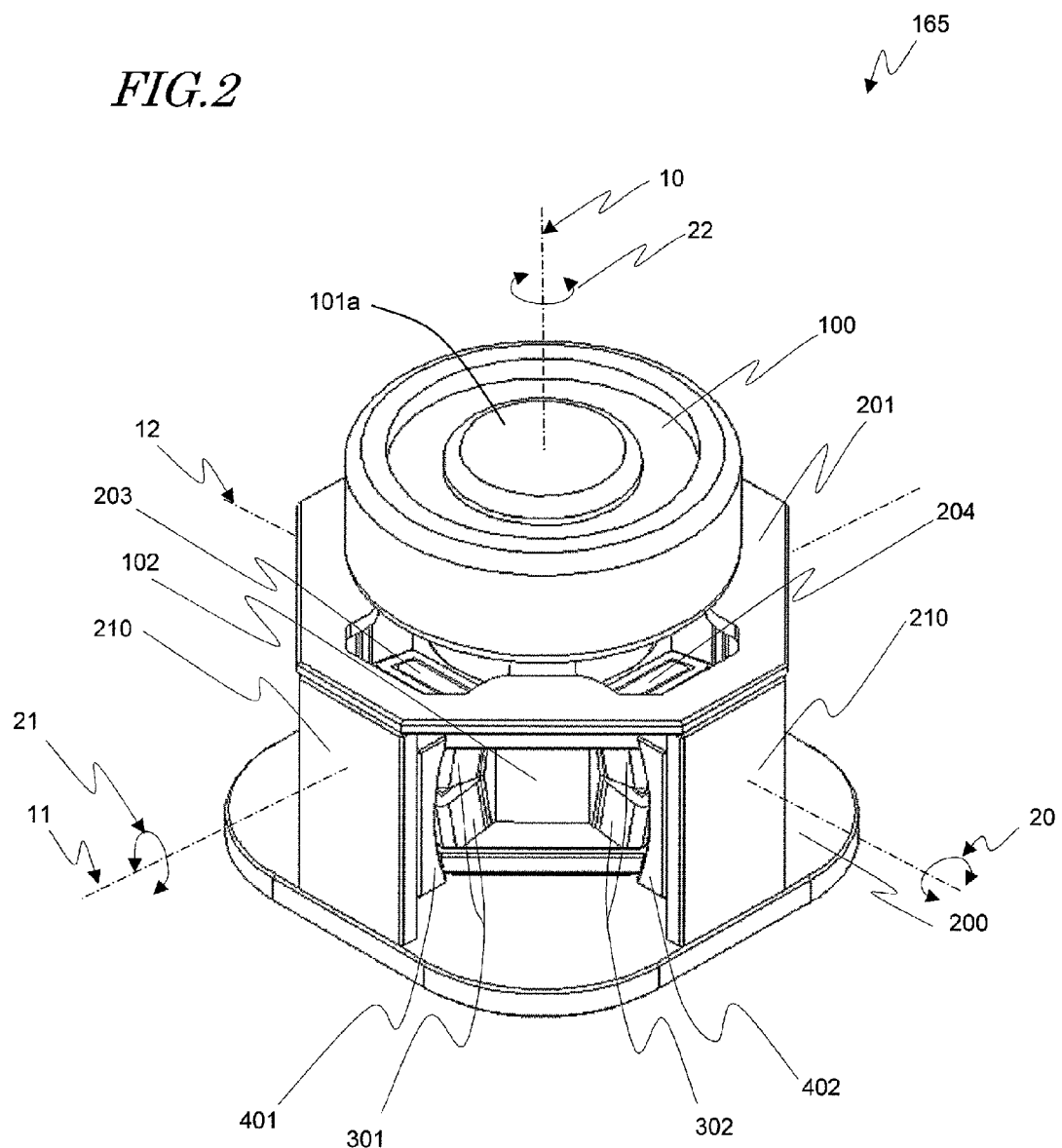
FIG. 2 is an isometric view of the camera device in this embodiment as seen from above.

Hereinafter, a camera driving apparatus in an embodiment according to the present invention will be described. FIG. 1 is an exploded isometric view of a camera driving apparatus 165 in an embodiment according to the present invention. FIG. 2 is an isometric view of the camera driving apparatus 165 as seen from above obliquely.

Figure 3:
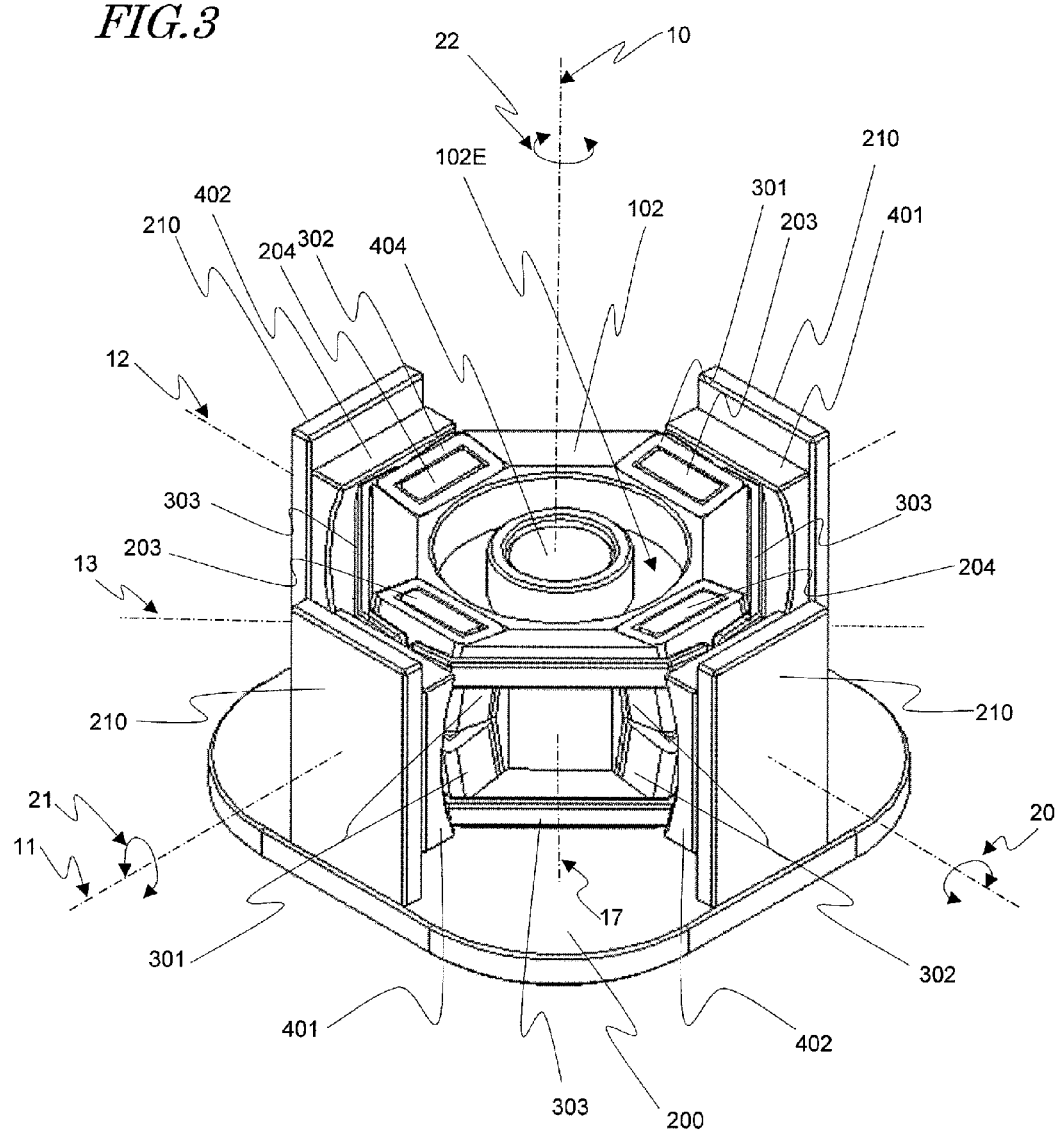
FIG. 3 is an isometric view of the camera device in this embodiment as seen from above in the state where a camera section 100 and a fall preventive member 201 have been removed.
Figure 4:
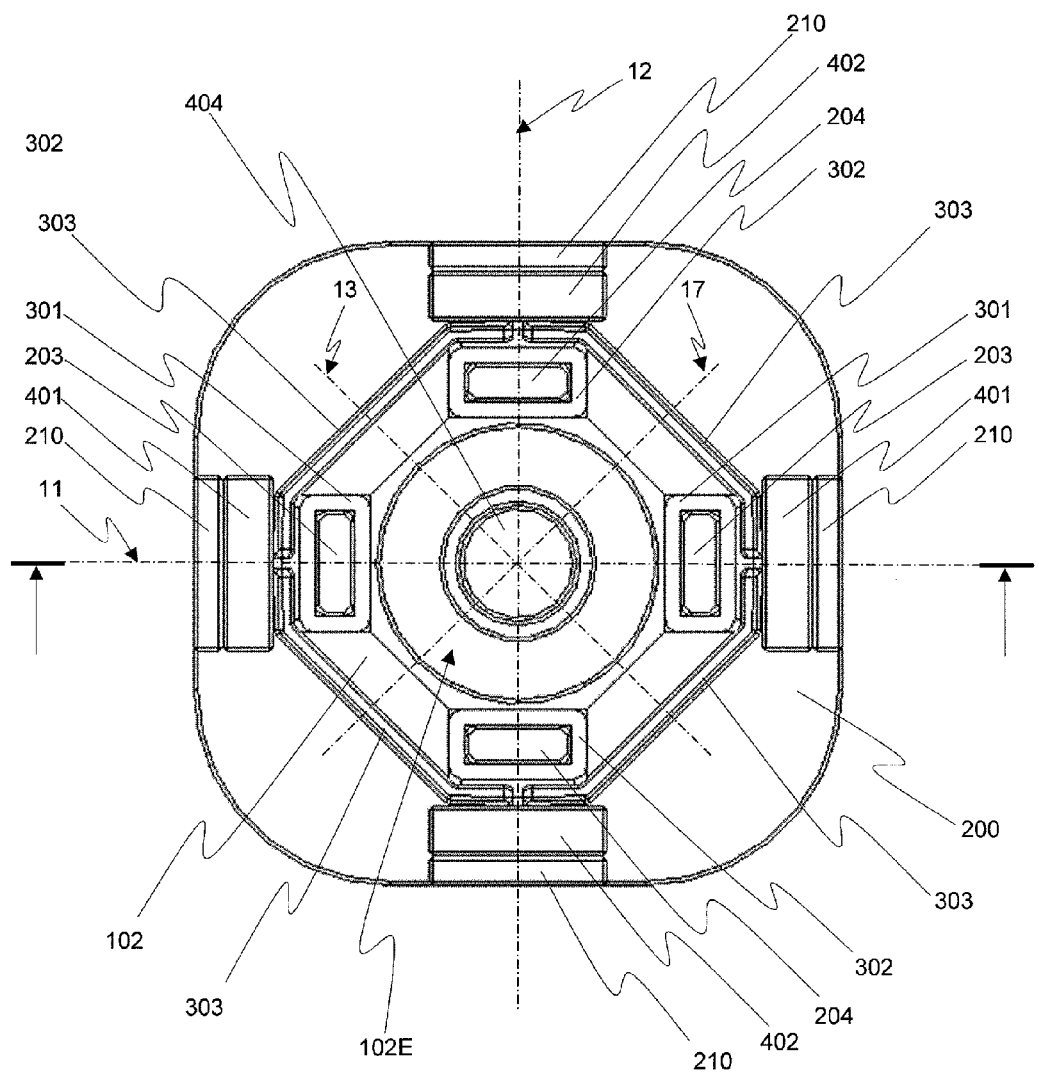
FIG. 4 is a plan view of the camera device in this embodiment as seen from above.

FIG. 3 is an isometric view of the camera driving apparatus 165 as seen from above obliquely in the state where a part of components thereof (camera section 100 and fall preventive member 201) has been removed. FIG. 4 is a plan view of the camera driving apparatus 165 in the state of FIG. 3 as seen from above.

Figure 5:
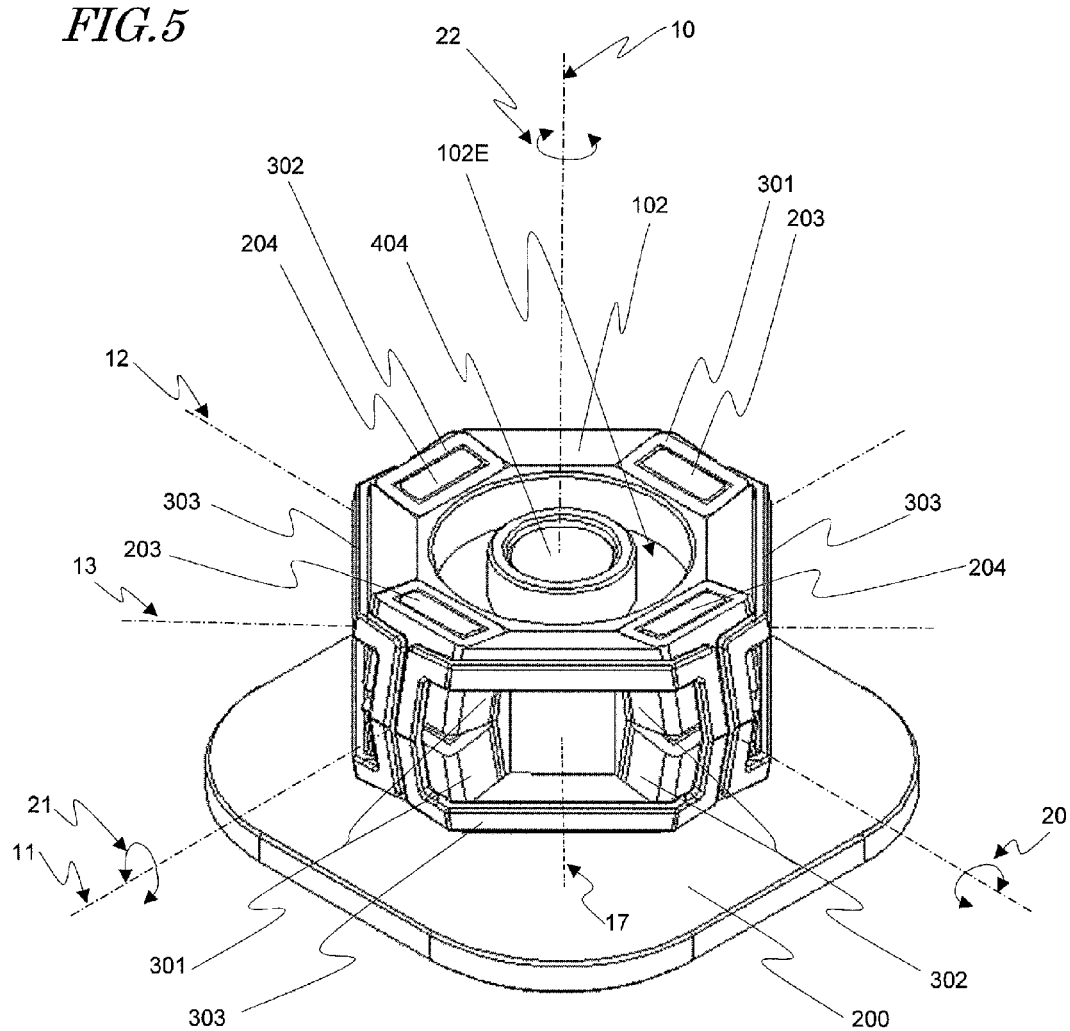
FIG. 5 is an isometric view of a movable unit without the camera section 100 in the camera device in this embodiment.
Figure 6:
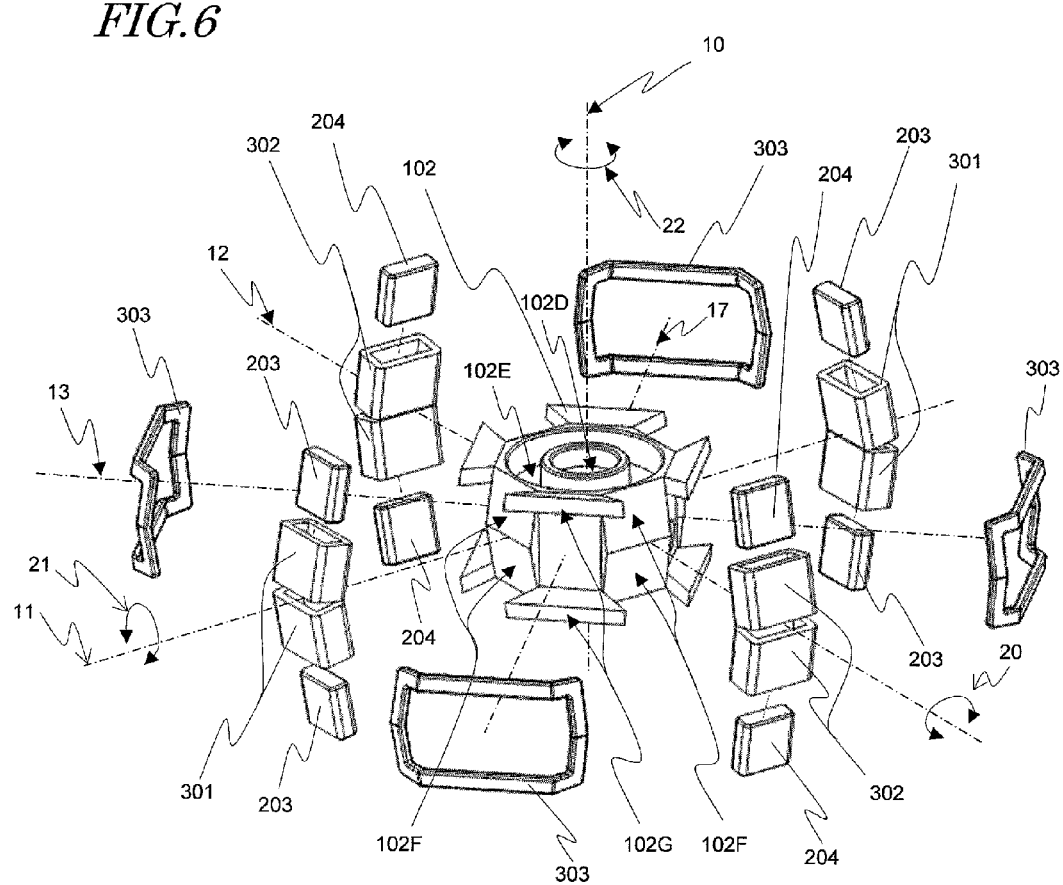
FIG. 6 is an exploded isometric view of the movable unit without the camera section 100 in the camera device in this embodiment.

FIG. 5 is an isometric view of a movable unit without the camera section 100 as seen from above obliquely. FIG. 6 is an exploded isometric view schematically showing a structure of the movable unit without the camera section 100.

Figure 7:
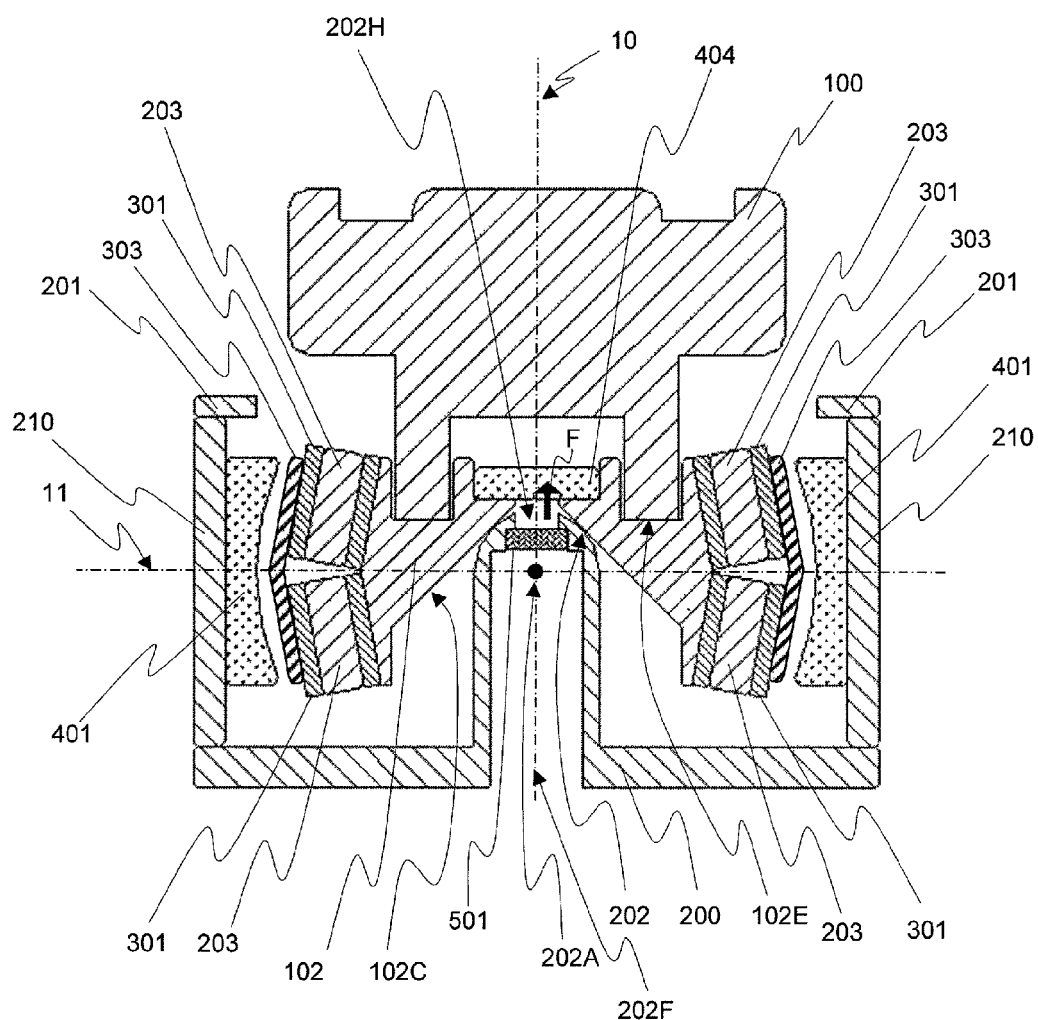
FIG. 7 is a partial cross-sectional view of the camera device in this embodiment taken along a plane including an optical axis 10 and a tilting direction rotation axis 11.
Figure 8:
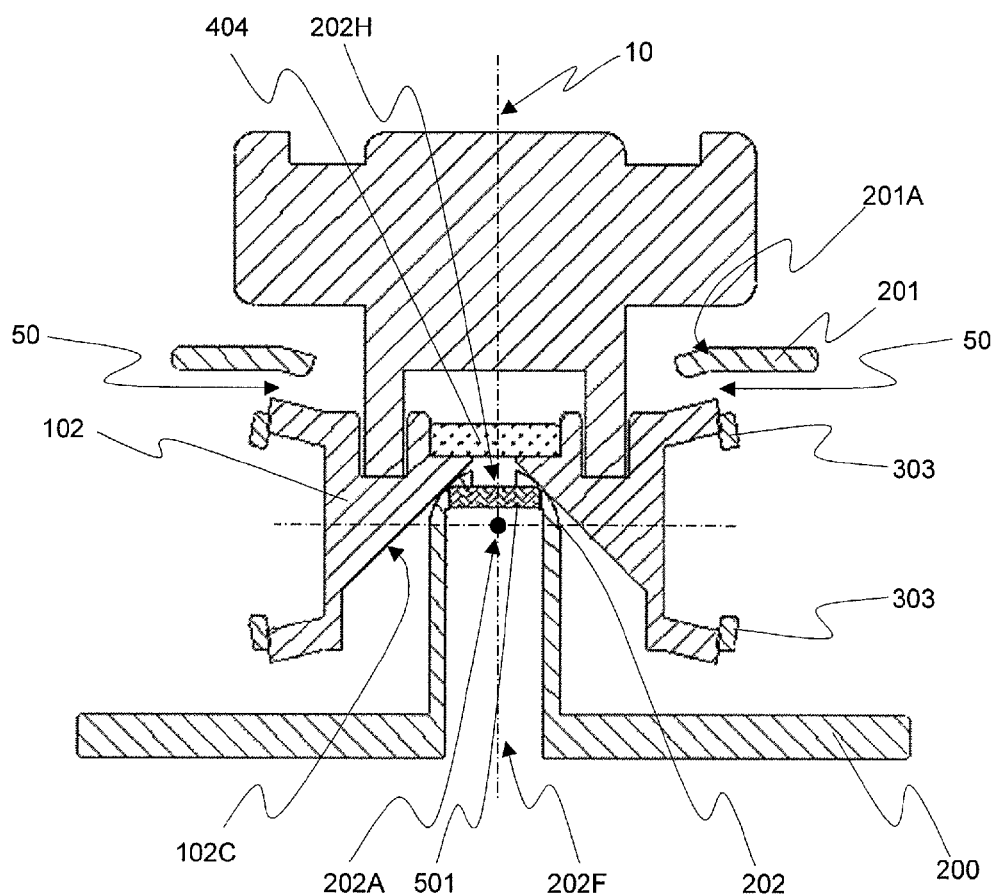
FIG. 8 is a partial cross-sectional view of the camera device in this embodiment taken along a plane including the optical axis 10 and a straight line 17.

FIG. 7 is a partial cross-sectional view of the camera driving apparatus 165 taken along a plane including an optical axis 10 and a tilting direction rotation axis 11. FIG. 8 is a partial cross-sectional view of the camera driving apparatus 165 taken along a plane including the optical axis 10 and a straight line 17 (having an angle of 45 degrees with respect to the tilting direction rotation axis 11).

Figure 9:
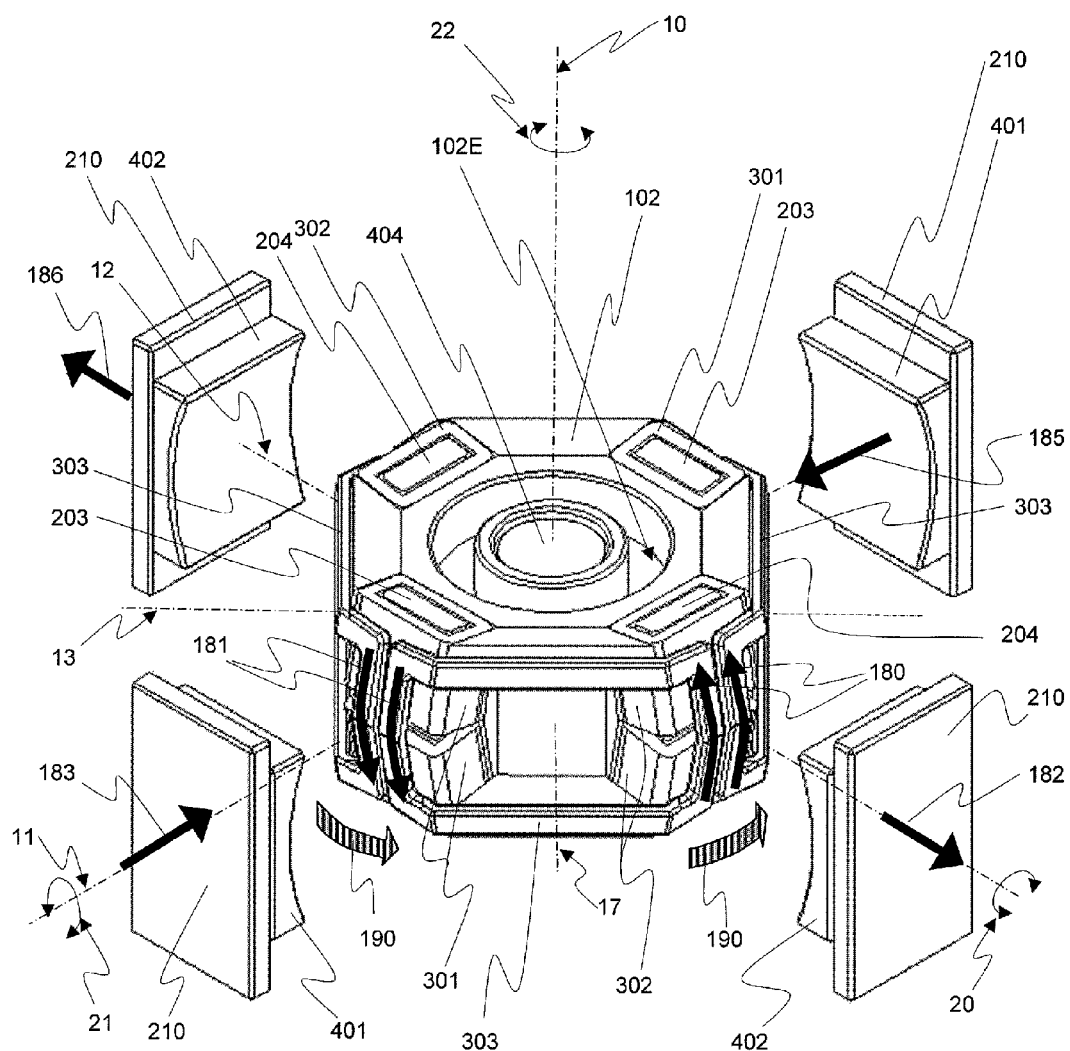
FIG. 9 is an exploded isometric view of the camera device in this embodiment as seen from above in the state where the camera section 100 and the fall preventive member 201 have been removed, which shows a driving principle in a rolling direction.

FIG. 9 is an exploded isometric view of the camera driving apparatus 165 in the state where the camera section 100 and the fall preventive member 201 have been removed, which shows a driving principle in a rolling direction.

With reference to there figures, a main structure of the camera driving apparatus 165 will be described.

The camera driving apparatus 165 includes the camera section 100, a movable unit for supporting the camera section 100, and a fixed unit. With respect to the fixed unit, the movable unit is freely rotatable in the rolling direction 22 around the optical axis 10 of a lens 101a (described later) as the center of rotation, in a titling direction 21 around the tilting direction rotation axis 11 as the center of rotation, and in a panning direction 20 around a panning direction rotation axis 12 as the center of rotation.

As shown in FIG. 1, the camera section 100 takes an image of a subject and generates an electrical signal representing the subject. More specifically, the camera section 100 includes an imaging element 101b, the lens 101a (not shown) having the optical axis 10 for forming an image of the subject on an imaging plane of the imaging element 101b, and a lens barrel 101c for holding the lens 101a; and converts the image formed on the imaging plane of the imaging element into an electrical signal.

The fixed unit includes a base 200 and a protrusion section 202. As shown in FIG. 7, the protrusion section 202 has a shape forming at least a part of a spherical face having a sphere center 202A, which is on the optical axis 10. Hereinafter, a portion having a shape forming at least a part of the spherical face will be referred to as the "partial spherical face".

As shown in FIG. 1 and FIG. 7, the protrusion section 202 is fixed to the base 200.

At least a part of the protrusion section 202 is formed of a magnetic member. The protrusion section 202 has a cylindrical structure having an opening 202F on the base 200 side. The protrusion section 202 also has a tip opening 202H in a tip portion thereof on the optical axis 10. The tip portion of the protrusion section 202 accommodates therein a magnetic sensor 501, inserted from the opening 202F, on the optical axis 10. A top portion of the magnetic sensor 501 is exposed to the tip opening 202H.

A movable section 102 forming a central part of the movable unit includes an attracting magnet 404 fixed to a fixed face 102D and a contact face 102C. The contact face 102C is an inner face defining a conical shape and is located on the movable section 102 such that a tip thereof is located on a top side. The attracting magnet 404 is located in the vicinity of the tip of the conical shape and is located in a top portion of the movable section 102. Preferably, the movable section 102 is formed of a non-magnetic material such as a resin material or the like.

As shown in FIG. 7, the protrusion section 202 of the fixed unit is inserted into a space defined by the conical contact face 102C of the movable section 102. The protrusion section 202 is partially formed of a magnetic member and so contacts the contact face 102C by a magnetic attracting force F of the attracting magnet 404 provided above the protrusion section 202 and thus is loosely engaged with the contact face 102C. Preferably, the center of gravity of the movable unit for supporting the camera section 100 matches the sphere center 202A in the state where the movable unit is supported by the protrusion section 202 of the fixed unit.

Owing to this, the movable section 102 is freely rotatable with respect to the sphere center 202A of the spherical face while the conical contact face 102C and the partial spherical face of the protrusion section 202 are in contact with each other.

More specifically, as shown in FIG. 1, the movable section 102 can rotate in two inclining directions, i.e., the panning direction 20 and the tilting direction 21, and also in the rolling direction 22. In the panning direction 20, the movable section 102 can rotate around the panning direction rotation axis 12, which is perpendicular to the optical axis 10 and passes the sphere center 202A. In the tilting direction 21, the movable section 102 can rotate around the tilting direction rotation axis 11, which is perpendicular to the optical axis 10 and the panning direction rotation axis 12. In the rolling direction 22, the movable section 102 can rotate around the optical axis 10 of the lens 101a.

As described above, in this embodiment, the movable unit supporting the camera section 100 is supported by the fixed unit so as to be freely rotatable around the sphere center 202A, and the center of gravity of the movable unit for supporting the camera section 100 matches the sphere center 202A. Therefore, the frictional load can be reduced, and the mechanical resonance in a driving frequency band can be significantly suppressed.

The attracting magnet 404 provides a constant vertical drag between the protrusion section 202 and the conical contact face 102C by a constant magnetic attracting force F without being influenced by the pivoting angle. This can suppress a fluctuation of the friction load in accordance with the pivoting angle, and can realize a good phase characteristic and a good gain characteristic in the driving frequency band.

In the case where a surface portion of the protrusion section 202 is covered with a resin material (not shown), the friction between the conical contact face 102C and the protrusion section 202, which are in contact with each other, can be further reduced. This can realize a supporting structure having a high abrasion resistance.

The fixed unit has a fall preventive structure for preventing the movable unit from falling from the fixed unit. Specifically, as shown in FIG. 1, FIG. 2 and FIG. 7, a ring-shaped fall preventive member 201 is fixed to the base 200 of the fixed unit via four coupling members 210. As shown in FIG. 1, the fall preventive member 201 includes four protrusion-like fall preventive regulation sections 201A extending toward the center of the ring, namely, toward the optical axis 10. The four fall preventive regulation sections 201A are provided in the form of two pairs.

As shown in FIG. 8, the fall preventive regulation sections 201A are each distanced from a part of the movable section 102 by a prescribed gap 50 in a direction of the optical axis 10. The fall preventive regulation sections 201A contact the movable section 102 to prevent the movable unit from rotating at an angle exceeding a prescribed angle, or to prevent the movable unit from being detached from the fixed unit when the contact face 102C of the movable unit is separated from the protrusion section 202 by an external impact.

As shown in FIG. 1, among the four fall preventive regulation sections 201A, one pair of fall preventive regulation sections 201A are located on a straight line 13, and the other pair of fall preventive regulation sections 201A are located on a straight line 17. The straight lines 13 and 17 have an angle of 45 degrees with respect to the panning direction rotation axis 12 and the tilting direction rotation axis 11. Specifically, on each of the straight lines 13 and 17, each pair of fall preventive regulation sections 201A are located symmetrically with respect to the optical axis 10.

When the movable unit is inclined at an angle of θ in both of the panning direction 20 and the tilting direction 21, the rotating angles of the movable unit with respect to the straight line 13 and the straight line 17, which have an angle of 45 with respect to the panning direction rotation axis 12 and the tilting direction rotation axis 11, are each $\sqrt{2} \times \theta$ or greater. Therefore, by providing the fall preventive regulation sections 201A for limiting the inclining angle in these directions, the pivoting of the movable unit is limited and the displacement of a part of the movable unit which is moved by a longest distance in the direction of the optical axis 10 by an external impact is limited. Thus, the movable unit can be prevented from falling with certainty.

By contrast, when the movable unit is inclined at an angle of θ in only one of the panning direction 20 and the tilting direction 21, the change of the height of the movable unit in the direction of the optical axis 10 caused by the inclination is largest in the other of the panning direction 20 and the tilting direction 21. The change of the height in the directions of the straight lines 13 and 17 is $1/\sqrt{2}$ times the change of the height in the other of the panning direction 20 and the tilting direction 21. Therefore, by making a width D of each of the fall preventive regulation sections 201A large as shown in FIG. 1, the movable unit can be safely prevented from falling.

The gap 50 is set to have a length by which even if the contact face 102C is separated from the protrusion section 202, the contact face 102C can be returned to a state of contacting the protrusion section 202 by the magnetic attracting force F of the attracting magnet 404. Namely, even in the state where the movable unit is moved upward by a distance equal to the gap 50 and so the fall preventive regulation sections 201A contact the movable section 102, the movable unit can be returned to the original state where the contact face 102C is in contact with the protrusion section 202 by the magnetic attracting force F of the attracting magnet 404.

Owing to this, this embodiment can provide a camera driving apparatus having a high impact resistance, in which the movable unit, even if instantaneously falling from a prescribed position, can be immediately returned to the original well-supported state by the magnetic attracting force F of the attracting magnet 404.

Now, a structure for driving the movable unit will be described. The camera driving apparatus 165 includes a driving mechanism for driving the movable unit. The driving mechanism includes a panning driving section and a tilting driving section for inclining the movable unit, having the camera section 100 mounted thereon, in the panning direction and the tilting direction 21 with respect to the fixed unit, and a rolling driving section for rotating the camera section 100 in the rolling direction 22 around the optical axis 10 of the lens 101*a* with respect to the fixed unit.

Specifically, the driving mechanism includes two pairs of driving magnets fixed to the base 200 via the coupling members 210 each formed of a magnetic member, magnetic yokes mounted on the movable unit, and driving coils wound around the magnetic yokes. More specifically, as shown in FIG. 1 and FIG. 6, the movable section 102 includes a pair of panning driving coils 301, located symmetrically with respect to the sphere center 202A on the tilting direction rotation axis 11, for driving and thus rotating the movable unit in the panning direction 20, a pair of tilting driving coils 302, located symmetrically with respect to the sphere center 202A on the panning direction rotation axis 12, for driving and thus rotating the movable unit in the tilting direction 21, and four rolling driving coils 303 for driving and thus rotating the movable unit around the optical axis 10. As shown in FIG. 1, FIG. 3 and FIG. 4, a pair of panning driving magnets 401 and a pair of tilting driving magnets 402 are provided on the base 200 along a circumference of a circle centered around the optical axis 10 via the coupling members 210 each formed of a magnetic material.

The pair of panning driving coils 301 and the pair of panning driving magnets 401 form a panning driving section. The pair of tilting driving coils 302 and the pair of tilting driving magnets 402 form a tilting driving section. The pair of panning driving magnets 401 and the pair of tilting driving magnets 402 also act as rolling driving magnets, and these driving magnets and the rolling driving coils 303 form a rolling driving section.

The pair of panning driving magnets 401 are magnetized oppositely to each other in the direction of the tilting direction rotation axis 11, namely, on a straight line which is on a plane perpendicular to the optical axis 10 and passes the sphere center 202A. Similarly, the pair of tilting driving magnets 402 are magnetized oppositely to each other in the direction of the panning direction rotation axis 12, namely, on a straight line which is on a plane perpendicular to the optical axis 10 and passes the sphere center 202A.

Preferably, each one of the panning driving magnets 401 and each one of the tilting driving magnets 402, which are adjacent to each other at an interval of 90 degrees on a circumference of a circle which is on a plane perpendicular to the optical axis 10 and is centered around a point at which the optical axis 10 crosses the plane, are magnetized oppositely to each other with respect to the sphere center. Such an arrangement of the magnetization directions can be realized by, for example, as shown in FIG. 9, magnetizing the pair of panning driving magnets 401 in inward directions 183 and 185 toward the sphere center and magnetizing the pair of tilting driving magnets 402 in outward directions 182 and 186 away from the sphere center.

As described above, the panning driving magnets 401 and the tilting driving magnets 402 are magnetized to have magnetic fluxes in the direction of the tilting direction rotation axis 11 and the direction of the panning direction rotation axis 12, respectively. As shown in FIG. 1 and FIG. 7, each of the panning driving magnets 401 and each of the tilting driving magnets 402 have a recessed curved face centered around the sphere center 202A.

The panning driving coils 301 are symmetrical with respect to a plane which is perpendicular to the optical axis 10 of the lens 101*a* and includes the sphere center 202A. The tilting driving coils 302 are symmetrical with respect to a plane which is perpendicular to the optical axis 10 of the lens 101*a* and includes the sphere center 202A. The panning driving coils 302 and the tilting driving coils 301 each have a generally V-shaped cross-section along a plane including the optical axis 10 of the lens 101*a*, and are each located such that the trough portion of the V-shaped cross-section faces the optical axis 10.

As shown in FIG. 6, the pair of panning driving coils 301 and the pair of tilting driving coils 302 are fixed to contact faces 102F provided on the movable section 102. By contrast, the four rolling driving coils 303 are fixed to contact faces 102G. As shown in FIG. 5, the four rolling driving coils 303 are each bonded and thus fixed to one of the panning driving coils 301 facing the panning driving magnets 401 and one of the tilting driving coils 302 facing the tilting driving magnets 402, so as to bridge a side face of the one of the panning driving coils 301 and a side face of the one of the tilting driving coils 302. A part of each rolling driving coil 303 overlaps a part of the corresponding panning driving coil 301 and a part of the corresponding tilting driving coil 302. The part of each rolling driving coil 303 overlapping the part of the panning driving coil 301 and the part of each rolling driving coil 303 overlapping the part of the tilting driving coil 302 are symmetrical with respect to a plane which is perpendicular to the optical axis 10 of the lens 101*a* and includes the sphere axis 202A. Each rolling driving coil 303 has a generally V-shaped cross-section along a plane including the optical axis 10 of the lens 101*a* and is located such that the trough portion of the V-shaped cross-section faces the optical axis 10.

As shown in FIG. 7, the position of the center of each panning driving magnet 401 and the position of the center of each panning driving coil 301 in the direction of the optical axis 10 approximately match the position of the sphere center 202A. Similarly, the position of the center of each tilting driving magnet 402 and the position of the center of each tilting driving coil 302 in the direction of the optical axis 10 approximately match the position of the sphere center 202A.

The panning driving section and the tilting driving section respectively include a pair of panning magnetic yokes 203 and a pair of tilting magnetic yokes 204, which are respectively located inner to the pair of panning magnetic coils 301 and the pair of tilting driving coils 302 and are both provided on the movable unit. The pair of panning driving coils 301 are respectively wound around the corresponding panning magnetic yokes 203. The pair of tilting driving coils 302 are respectively wound around the corresponding tilting magnetic yokes 204. As shown in FIG. 4, the pair of panning magnetic yokes 203 and the pair of tilting magnetic yokes 204 each overlap also with the corresponding rolling driving coil 303, and the panning magnetic yokes 203 and the tilting magnetic yokes 204 also act as rolling magnetic yokes.

In other words, as shown in FIG. 5, four coil units, each of which includes each of the pair of panning driving coils 301 or each of the pair of tilting driving coils 302 and also includes each of the four rolling driving coils 303, are located at an interval of 90 degrees on a circumference of the movable section 102 centered around the optical axis 10.

As shown in FIG. 6 and FIG. 7, the height position of the center of each panning driving coil 301, each tilting driving coil 302 and each rolling driving coil 303 in the direction of the optical axis 10 approximately matches the position of the sphere center 202A.

By electrifying the pair of panning driving coils 301, the pair of panning driving coils 301 receive a couple electromagnetic force from the pair of panning driving magnets 401, and thus the movable section 102, namely, the movable unit is driven to rotate in the panning direction 20 around the panning direction rotation axis 12.

Similarly, by electrifying the pair of tilting driving coils 302, the pair of titling driving coils 302 receive a couple electromagnetic force from the pair of tilting driving magnets 402, and thus the movable unit is driven to rotate in the titling direction 21 around the tilting direction rotation axis 11.

By electrifying the panning driving coils 301 and the tilting driving coils 302 at the same time, the movable unit having the camera section 100 mounted thereon can be inclined two-dimensionally.

By electrifying the four rolling driving coils 303 located on a circumference of a circle centered around the optical axis 10, the four rolling driving coils 303 receive an electromagnetic force from the pair of panning driving magnets 401 and the pair of tilting driving magnets 402, and thus the movable unit having the camera section 100 mounted thereon is driven to rotate in the rolling direction 22 around the optical axis 10.

More specifically, as shown in FIG. 9, when the rolling driving coils 303 are electrified, a driving current flows in an upward direction 180 in the part of each rolling driving coil 303 overlapping the corresponding tilting driving magnet 402 and in a downward direction 181 in the part of each rolling driving coil 303 overlapping the corresponding panning driving magnet 401.

Accordingly, by magnetizing the tilting driving magnets 402 in the outward directions 182 and 186 away from the optical axis 10 and magnetizing the panning driving magnets 401 in the inward directions 183 and 185 toward the optical axis 10, an electromagnetic force 190 of the Fleming's left-hand rule is generated in the same direction around the optical axis 10 in each driving magnet and the part of each coil facing the corresponding driving magnet. Thus, the movable unit is rotated in the rolling direction 22.

As described above, this embodiment adopts a moving coil driving system in which the panning driving coils 301, the tilting driving coils 302 and the rolling driving coils 303 are provided for the movable unit. This structure generally has an advantage of capable of reducing the weight of the movable unit.

In this embodiment, no exclusive driving magnet for driving in the rolling direction 22 is provided, and the panning driving magnets 401 and the tilting driving magnets 402 also act as driving magnets for driving in the rolling direction 22. This can reduce the weight of the camera driving apparatus 165 and also decrease the number of components thereof.

In addition, a coil structure is provided in which four rolling driving coils 303 are each bonded and thus fixed so as to bridge one side face of the corresponding panning driving coil 301 and one side face of the corresponding tilting driving coil 302. A magnet structure is provided in which each one of the panning driving magnets 401 and each one of the tilting driving magnets 402, which are adjacent to each other at an interval of 90 degrees in a circumferential direction of a circle centered around the optical axis 10, are magnetized oppositely to each other. Owing to these structures, the effective length of each of the four rolling driving coils 303 for generating an electromagnetic force can be increased. Thus, the driving efficiency in the rolling direction 22 can be improved.

Now, a function of returning the movable unit to a neutral position using the magnetic attracting force F will be described. As shown in FIG. 4, the pair of panning magnetic yokes 203 and the pair of tilting magnetic yokes 204 are respectively located to face the pair of panning driving magnets 401 and the tilting driving magnets 402. Therefore, when the rotating angle in the rolling direction 22 is 0 degrees, a magnetic gap between each panning driving magnet 401 and the corresponding panning magnetic yoke 203, and a magnetic gap between each tilting driving magnet 402 and the corresponding tilting magnetic yoke 204 are minimized. Therefore, when the rolling driving coils 303 are not electrified, the movable unit can be kept at a neutral position in the rolling direction 22, namely, a position at which the panning driving magnets 401 and the tilting driving magnets 402 are respectively closest to the panning magnetic yokes 203 and the tilting magnetic yokes 204, by a magnetic spring effect utilizing a fluctuation of the magnetic attracting force.

As described above, in this embodiment, the central axes of the camera section 100, the movable section 102, the protrusion section 202 and the attracting magnet 404 are all located to match the optical axis 10 passing the sphere center 202A, which is the supporting center and also the driving center. Therefore, the center of gravity of the movable unit matches the sphere center 202A and the movable unit can be supported at the center of gravity. Moreover, the rotations around three axes which pass the center of gravity and are perpendicular to one another can be realized. In addition, the movable can be prevented from falling.

The camera driving apparatus 165 may include a viscous member (not shown) in order to decrease the amplitude increase coefficient (Q factor) of the movable unit. In this case, as shown in FIG. 8, the viscous member is provided in the vicinity of the conical contact face 102C and the protrusion section 202.

To the viscous member 60, a magnetic fluid may be added. In this case, the viscous member combined with the magnetic fluid can be held by the contact face 102C more certainly by the magnetic attracting force F of the attracting magnet 404. In the case where the magnetic fluid also has viscosity, only the magnetic fluid may be used instead of the viscous member.

Now, detection of the inclination and the rotation of the movable unit will be described. The camera driving apparatus 165 includes a detector for detecting an inclining angle of the movable unit, having the camera section 100 mounted thereon, and a rotating angle of the movable unit around the optical axis 10 of the lens 101a, with respect to the fixed unit. Specifically, the camera driving apparatus 165 includes a first detection section for detecting a two-dimensional inclining angle of the movable unit, namely, a rotating angle in the panning direction 20 and the tilting direction 21, and second detection sections for detecting an inclining angle around the optical axis 10 of the lens 101a.

First, detection of an inclining angle of the movable unit in the panning direction 20 and the tilting direction 21 will be described.

As shown in FIG. 1, FIG. 7 and FIG. 8, the camera driving apparatus 165 includes the first magnetic sensor 501 as the first detection section for detecting an inclining angle of the movable unit. The first magnetic sensor 501 is provided on the fixed unit.

More specifically, the first magnetic sensor 501 is capable of detecting inclination around two axes or rotation, and is located inside the protrusion section 202 so as to face the attracting magnet 404 magnetized to one pole in the direction of the optical axis 10.

Figure 10:
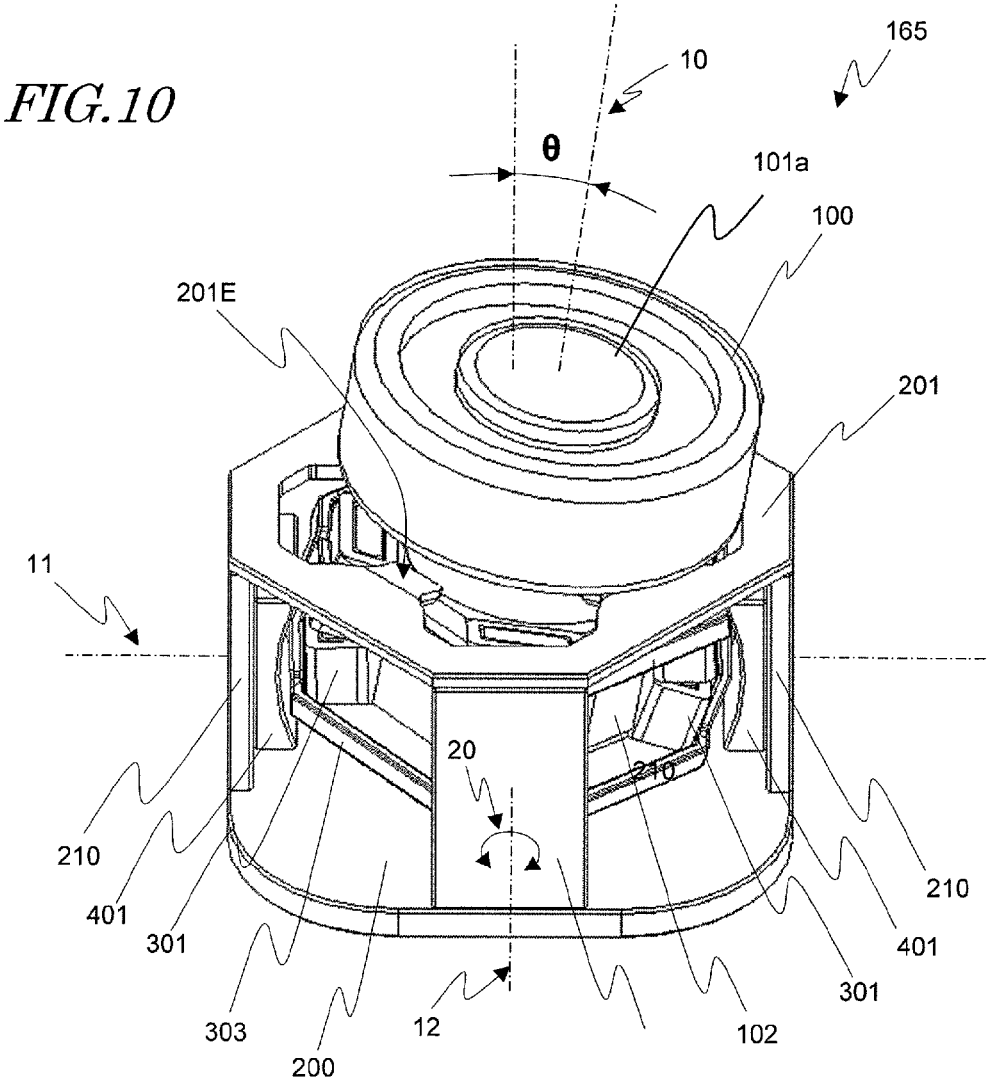
FIG. 10 is an isometric view of the camera device in this embodiment in the state where the camera section is inclined at an angle of θ in a panning direction.
Figure 11:
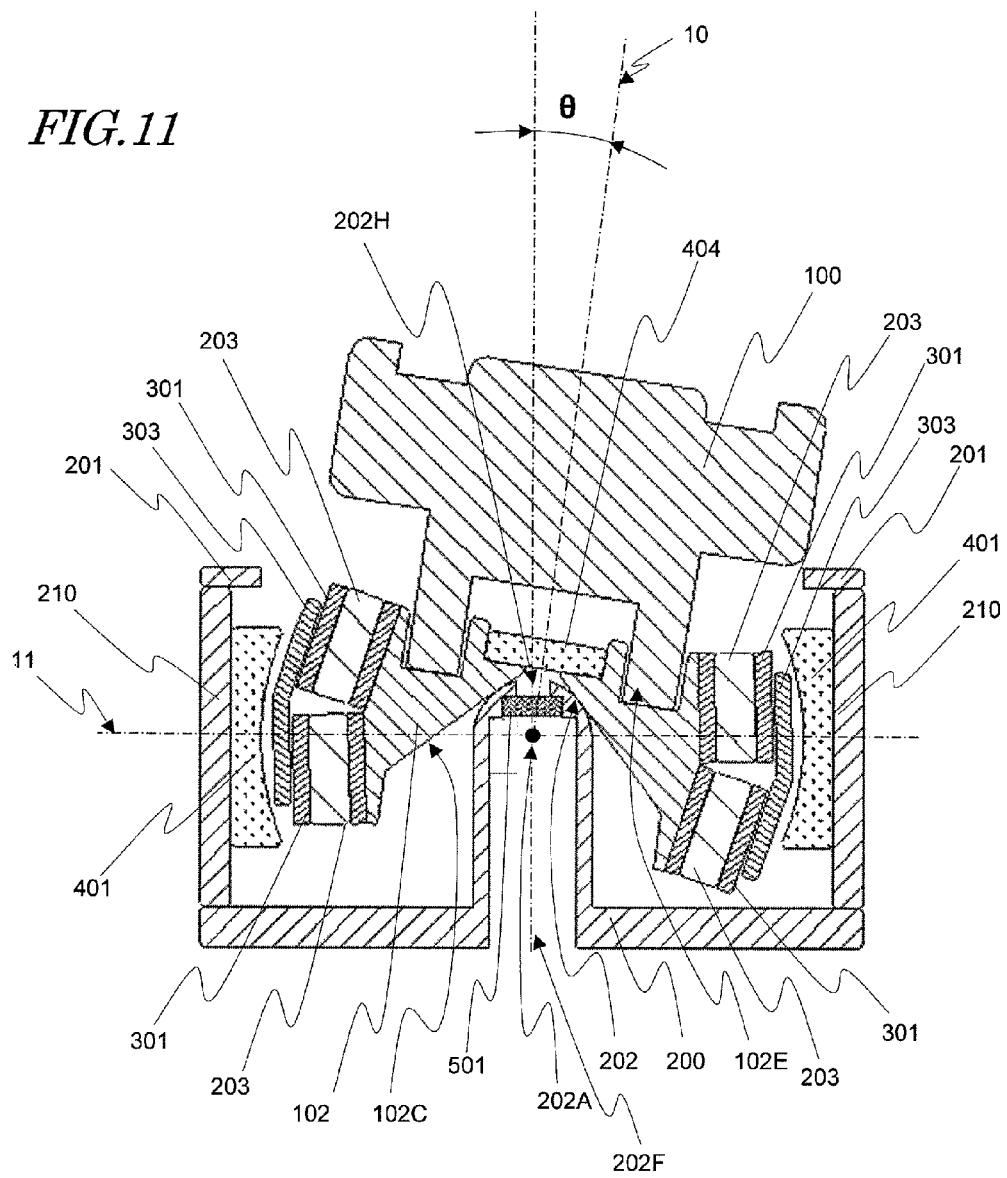
FIG. 11 is a partial cross-sectional view of the camera device in this embodiment taken along a plane including the optical axis 10 and the tilting direction rotation axis 11 in the state where the camera section is inclined at an angle of θ in the panning direction.

FIG. 10 is an isometric view of the camera driving apparatus as seen from above in the state where the camera section is inclined at an angle of θ in the panning direction. FIG. 11 is a partial cross-sectional view thereof taken along a plane including the optical axis 10 and the tilting direction rotation axis 11.

Referring to FIG. 11, inside the first magnetic sensor 501, a pair of hall elements (not shown) are located symmetrically with respect to the optical axis 10 on the tilting direction rotation axis 11, and another pair of hall elements (not shown) are located symmetrically with respect to the optical axis 10 on the panning direction rotation axis 12. The first magnetic sensor 501 can detect a change of the magnetic force of the attracting magnet 404 which is caused by the inclination motion of the movable unit at an angle of θ in the panning direction 20 as a biaxial component and thus can calculate a panning inclining angle and a tilting inclining angle.

In the tip portion of the protrusion section 202, the tip opening 202H is provided so that a line of magnetic force of the attracting magnet 404 can directly enter the magnetic sensor 501.

As described above, in this embodiment, the attracting magnet 404 acts as a magnet for detecting an inclining angle in addition to having a function of providing the protrusion section 202 with the magnetic attracting force F. Therefore, the number of components of the apparatus can be decreased and the size of the apparatus can be reduced. In addition, there are advantages that the distance between the attracting magnet 404 and the sphere center 202A can be made shorter, and thus the first magnetic sensor 501 can be reduced in size.

Figure 12:
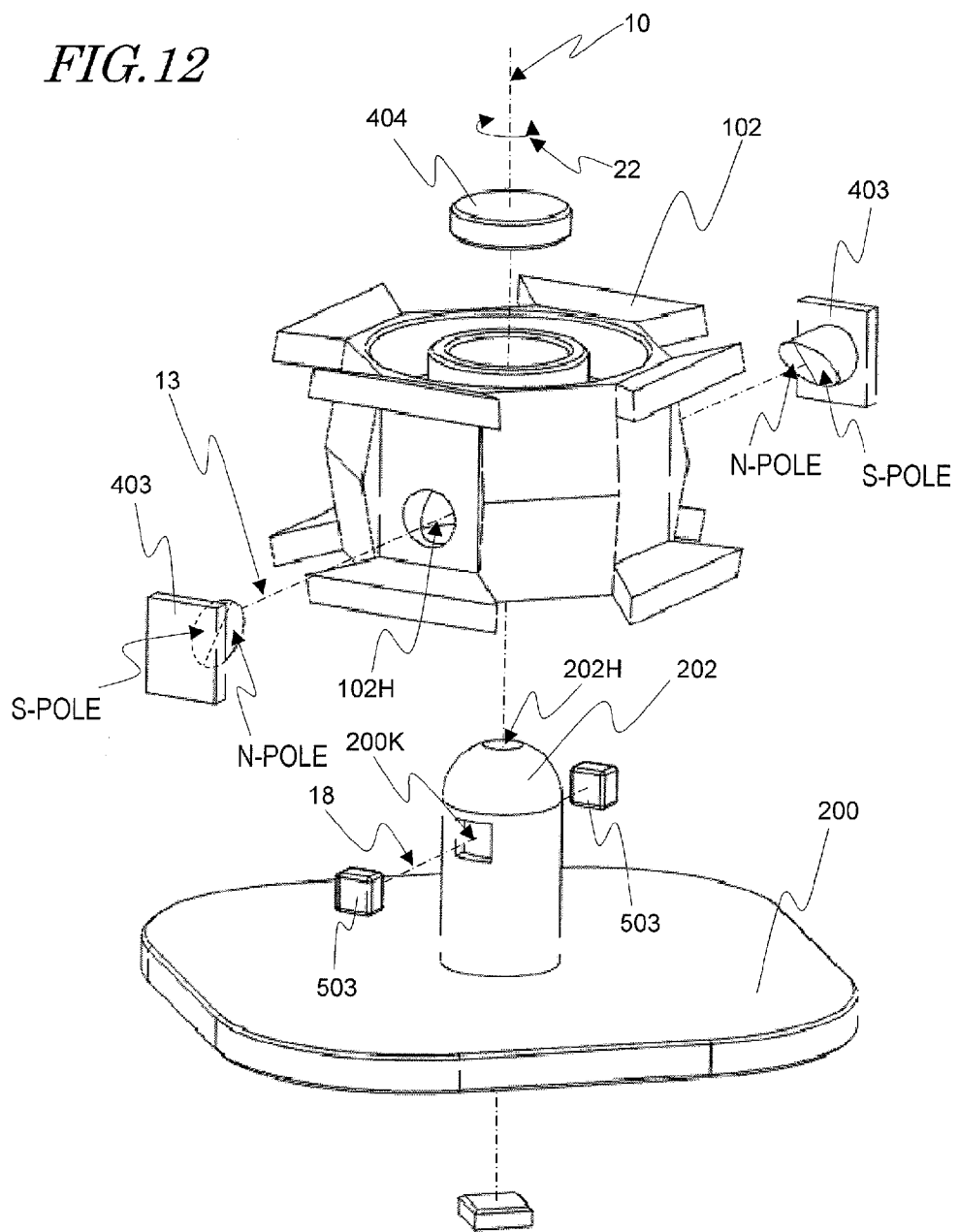
FIG. 12 is an exploded isometric view of a detection section for detecting rotation in a rolling direction in the camera device in this embodiment.
Figure 13:
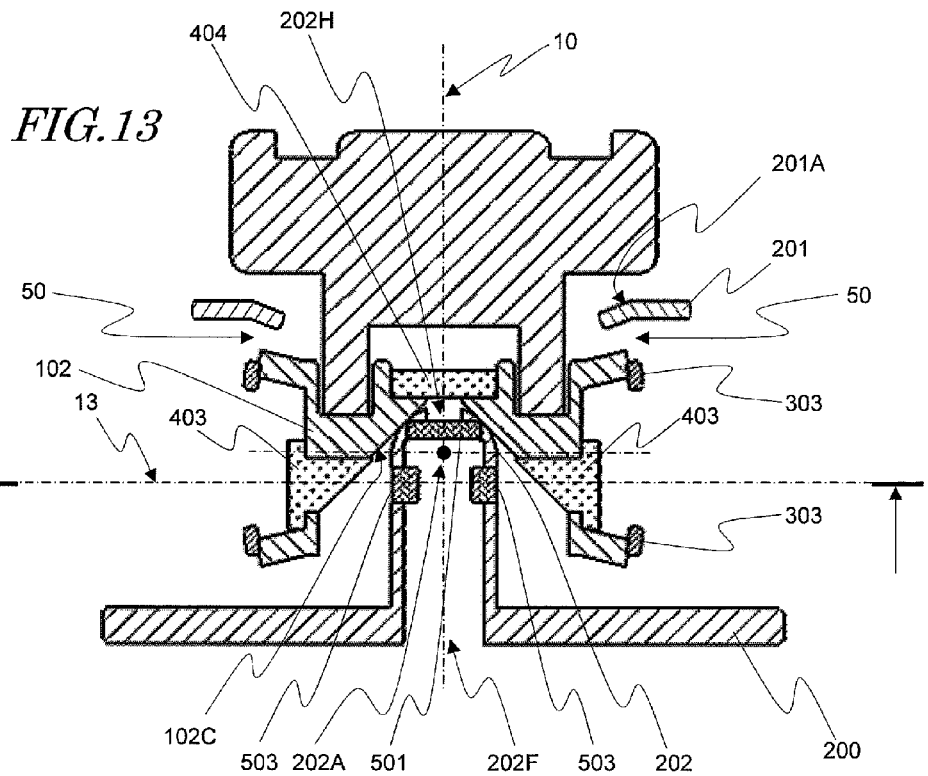
FIG. 13 is a cross-sectional view of a structure of the detection section for detecting rotation in the rolling direction and the vicinity thereof, taken along a plane including the optical axis 10 and a straight line 13.
Figure 14:
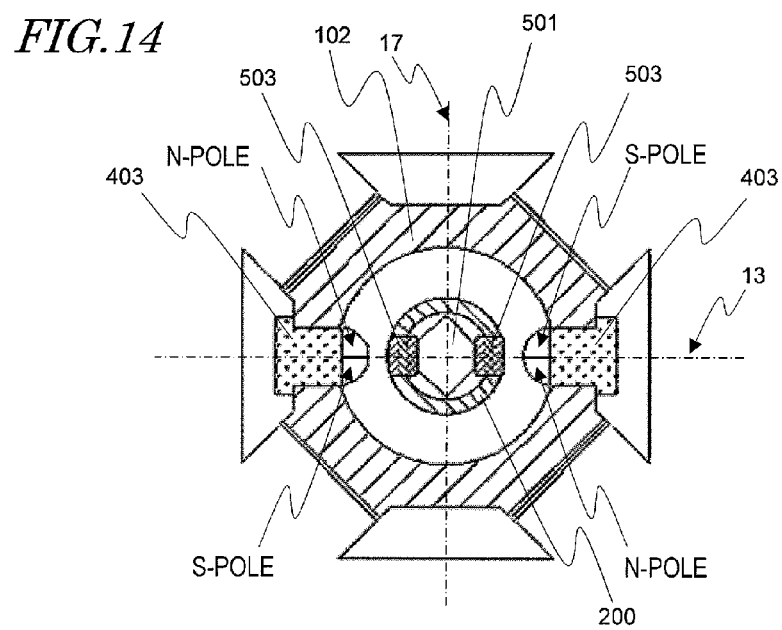
FIG. 14 is a cross-sectional view of the structure of the detection section for detecting rotation in the rolling direction and the vicinity thereof, taken along a plane including the straight line 13 and the straight line 17.

Now, detection of a rotating angle of the movable unit in the rolling direction 22 will be described. FIG. 12 is an exploded isometric view showing locations of the second magnetic sensors 503 as the second detection sections for detecting a rotating angle of the movable unit in the rolling direction 22 around the optical axis 10. FIG. 13 is a partial cross-sectional view of the second detection sections taken along a plane including the optical axis 10 and the straight line 13. FIG. 14 is a partial cross-sectional view of the second detection sections taken along a plane including the straight line 13 and the straight line 17.

The second detection sections are located symmetrically with respect to the sphere center 202A on a plane which is perpendicular to the optical axis 10 and passes the sphere center 202A in order to detect a rotating angle of the movable unit in the rolling direction 22 around the optical axis 10. When being seen in the direction of the optical axis 10 in the state where the movable unit is at the neutral position, the second detection sections are located at an angle of 45 degrees with respect to the panning driving section or the tilting driving section. As shown in FIG. 12, FIG. 13 and FIG. 14, the second detection sections specifically include a pair of second magnetic sensors 503 and a pair of rotation detection magnets 403. The pair of second magnetic sensors 503 detect a change, caused by the rotation, of the magnetic force of the rotation detection magnets 403 and thus calculate the rotating angle of the movable unit. The pair of second magnetic sensors 503 are located symmetrically with respect to the sphere center 202A on a straight line which is on a plane perpendicular to the optical axis 10 and passes the sphere center 202A. The pair of rotation detection magnets 403 are located symmetrically with respect to the sphere center 202A on a straight line which is on a plane perpendicular to the optical axis 10 and passes the sphere center 202A.

The pair of second magnetic sensors 503 are located on the protrusion section 202 of the fixed unit on the straight line 13 which is perpendicular to the optical axis 10 and has an angle of 45 degrees with respect to the tilting direction rotation axis 11 or the panning direction rotating angle 12. The pair of rotation detection magnets 403 are respectively inserted into, and fixed in, a pair of openings 102H made in the protrusion section 202 symmetrically with respect to the sphere center 202A of the movable section 102.

As shown in FIG. 12 and FIG. 14, the pair of rotation detection magnets 403 are each divided and magnetized to two poles. Specifically, the pair of rotation detection magnets 403 each include two magnetic poles which are arranged in the circumferential direction of a circle centered around the optical axis 10 on a plane perpendicular to the optical axis 10 and are magnetized oppositely to each other. Because of this, the pair of rotation detection magnets 403 are magnetized in a direction passing the sphere center 202A and are located such that opposite poles face each other.

The pair of rotation detection magnetic sensors 503 are respectively inserted into, and fixed in, a pair openings 200K made in a side face of the protrusion section 202 so as to face central borderlines between the divided poles of the pair of rotation detection magnets 403.

As shown in FIG. 13, the pair of rotation detection magnets 403 each have an obliquely cut tip portion such that the cut surface is approximately flush with the conical contact face 102C of the movable section 102, for the purpose of locating the rotation detection magnets 403 as close as possible to the second magnetic sensors 503.

When the movable unit is rotated in the rolling direction 22, the magnetic poles of the pair of rotation detection magnets 403 move. This movement causes a drastic change of the magnetic force, and this change is detected by the second magnetic sensors 503. Owing to this, the rotating angle of the movable unit around the optical axis 10 can be detected at a high precision.

When the movable section 102 of the movable unit is inclined in the panning direction 20 and the tilting direction 21, a crosstalk output may be generated in the rolling direction 22.

However, this crosstalk output can be canceled by detecting a change of the magnetic force of the pair of rotation detection magnets 403 by use of the pair of second magnetic sensors 503. Accordingly, only the rotating angle in the rolling direction 22 can be accurately extracted and detected in the range in which the movable unit can be inclined.

As shown in FIG. 1 and FIG. 12, the pair of second magnetic sensors 503 are located on the straight line 13 having an angle of 45 degrees with respect to the tilting direction rotation axis 11 or the panning direction rotation axis 12, on opposite sides to each other while having the optical axis 10 therebetween. Owing to this, it is possible to provide a driving coil unit on a circumference of a circle having a large radius centered around the optical axis 10 to improve the driving moment and also to locate the second magnetic sensors 503 on a circumference of a circle having a small radius centered around the optical axis 10. Thus, the space can be effectively used.

As described above, the camera driving apparatus in this embodiment adopts a structure in which the sphere center of the partial spherical face provided on the protrusion section of the fixed unit and the central axis of the conical contact face of the movable unit are located on the optical axis of the lens of the camera section. Therefore, a structure for supporting the movable unit at the center of gravity is realized, and so the mechanical resonance in the driving frequency band can be significantly suppressed.

In a pivot structure formed of the protrusion section and the contact face of the movable unit, a constant vertical drag can be provided by a magnetic attracting force which is unlikely to be influenced by the pivoting angle of the movable unit. Therefore, a fluctuation of the frictional load in accordance with the pivoting angle is reduced, and a good phase characteristic and a good gain characteristic can be realized in the driving frequency band.

Conventionally, how to prevent the movable unit from falling due to an external disturbance such as vibration, impact or the like has been a serious problem specific to a supporting structure utilizing a magnetic attracting force. In order to solve this problem, fall preventive regulation sections are provided on the fixed unit at positions distanced from the movable unit by a prescribed gap along which the movable unit is pivotable. Therefore, the movable unit can be prevented from falling with certainty while avoiding the apparatus from being increased in size.

The position of the fall preventive regulation sections is determined such that even if the movable unit moves until contacting the fall preventive regulation sections on the fixed unit, the protrusion section of the fixed unit and the contact face of the movable unit are put into contact with each other again by the magnetic attracting force F to form a pivot structure. Therefore, a camera driving apparatus having a very high impact resistance can be provided, in which the movable unit, even if instantaneously falling, can be immediately returned to the original well-supported state.

The driving sections for driving in the panning, tilting and rolling directions include two pairs of driving magnets for inclination which are respectively located on two lines perpendicular to each other on a plane perpendicular to the optical axis and are fixed to the movable unit; four driving coils for rotation; and two pairs of driving magnets located on a circumference of a circle centered around the optical axis on a plane which is perpendicular to the optical axis and passes the rotation center of the movable unit and provided on the fixed unit so as to face the driving coils.

The height position of these components in the direction of the optical axis is approximately equal to the height position of the sphere center of the protrusion section. Therefore, the movable unit can be driven as being centered around the center of gravity, and the mechanical resonance in the driving frequency band can be significantly suppressed.

The surface portion of the protrusion section is covered with a resin material, and a magnetic member for providing a magnetic attracting force is provided inside the protrusion section. Owing to this, a supporting structure having a low friction and a high abrasion resistance is realized.

A viscous member or a viscous member containing a magnetic fluid is provided in a space in the vicinity of the conical contact face of the movable unit and the protrusion section of the fixed unit. Owing to this, the amplitude increase coefficient (Q factor) of vibration caused by a magnetic spring effect, which is provided by the magnetic attracting force generated between the magnets provided on the movable unit and the magnetic yokes provided on the fixed unit, can be decreased. The Q factor of the inherent mechanical vibration can be also decreased. Thus, a good control characteristic can be provided.

The first magnetic sensor is provided on the fixed unit so as to face the attracting magnet. Owing to this, a change of the magnetic force of the attracting magnet caused by the inclination and the rotation of the movable unit is detected, and the inclining angle and the rotating angle can be calculated. Since the attracting magnet for supporting the fixed unit and the movable unit by a pivot structure is usable for detecting the angles, the number of components of the apparatus can be decreased and the apparatus can be reduced in size.

A pair of rotation detection magnets magnetized oppositely to each other, on a plane perpendicular to the optical axis, in a circumferential direction of a circle centered around the position of the optical axis are provided on the movable unit, and a change of the magnetic force is detected by a second magnetic sensor provided on the fixed unit. Using the output of this detection, the crosstalk output which is generated when the movable unit is pivoted in the panning direction and the tilting direction can be cancelled. Therefore, only the rotating angle in the rolling direction can be extracted and detected in the range in which the movable unit can be pivotable.

A pair of second magnetic sensors are located on a straight line having an angle of 45 degrees with respect to the tilting direction rotation axis or the panning direction rotation axis, on opposite sides to each other while having the optical axis therebetween. Owing to this, it is possible to provide a driving section on a circumference of a circle having a large radius centered around the optical axis to improve the driving moment and also to locate the second magnetic sensors on a circumference of a circle having a small radius centered around the optical axis. Thus, the space can be effectively used.

Accordingly, the camera driving apparatus in this embodiment allows the movable unit to, for example, incline at a large angle of ±10 degrees or greater in the panning direction and the tilting direction, and also to rotate at a large angle of ±10 degrees or greater in the rolling direction. In addition, good shake compensation control is realized in a wide frequency band of up to about 50 Hz.

As a result, the camera driving apparatus realizes high-speed panning, tilting and rolling motions of the camera section and also can compensate for image blurring of a photo caused by camera-shake while the photographer is walking. Moreover, the camera driving apparatus has a compact and solid fall preventive structure and so is highly resistant against an external impact such as vibration, falling or the like.

(Embodiment 2)

Figure 15:
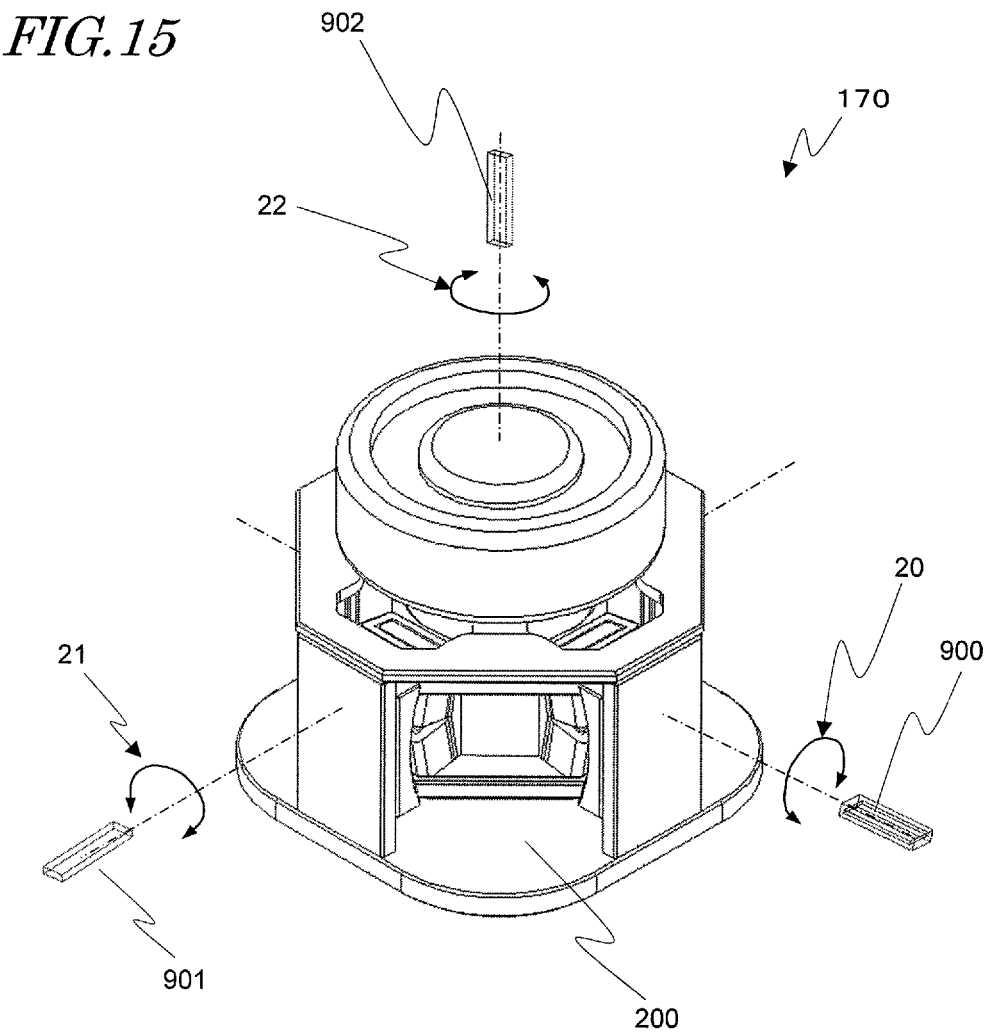
FIG. 15 is an isometric view showing locations of angular velocity sensors provided in a camera unit in an embodiment according to the present invention.

A camera unit in an embodiment according to the present invention will be described. A camera unit 170 in this embodiment includes a camera driving apparatus and a control section, and can compensate for image blurring of a photo taken while the photographer is walking. FIG. 15 is an isometric view showing a main part of the camera unit 170, and FIG. 16 is a block diagram of the camera unit 170.

Figure 16:
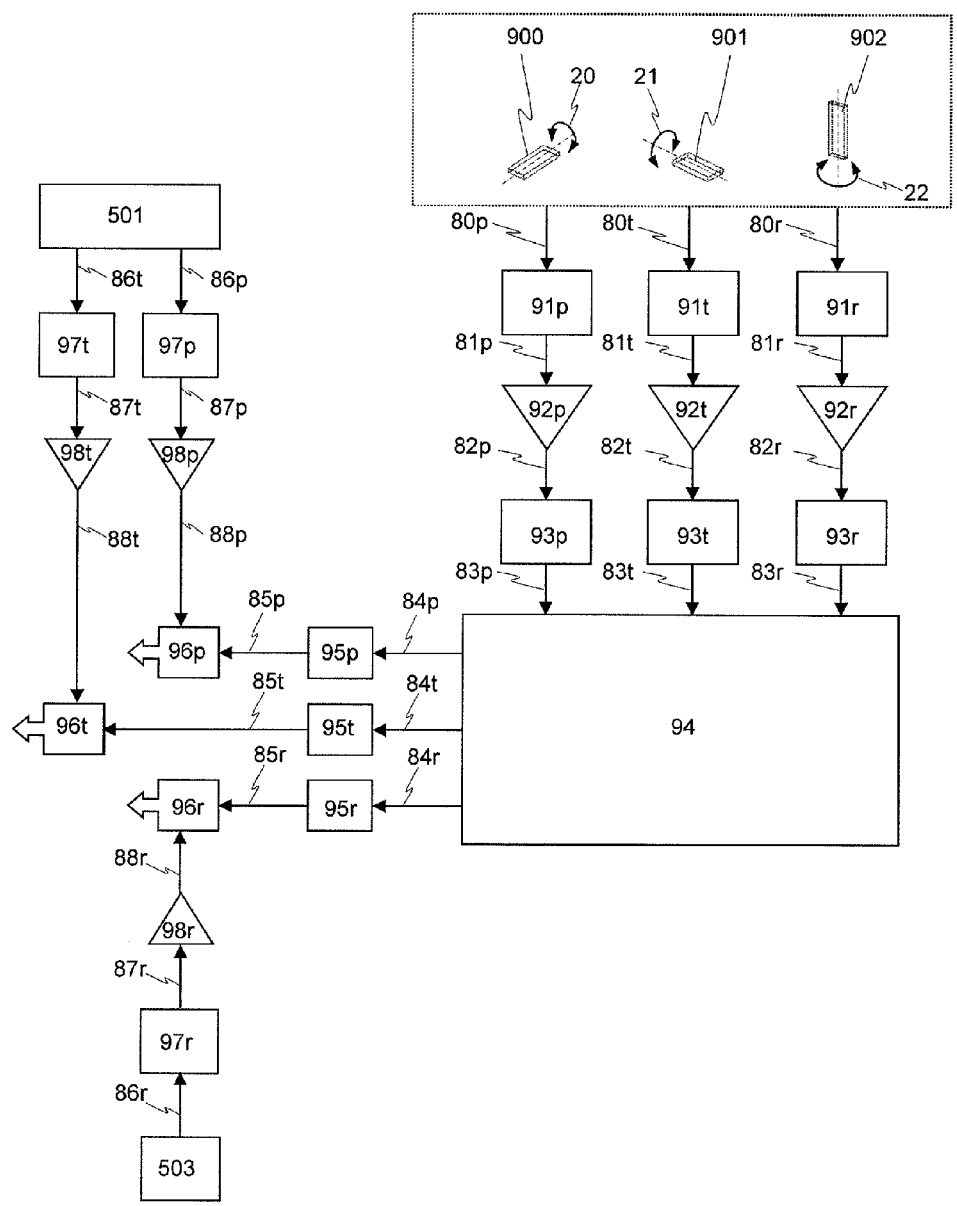
FIG. 16 is a block diagram showing the camera unit in this embodiment.

As shown in FIG. 15 and FIG. 16, the camera unit 170 includes the camera driving apparatus 165, angular velocity sensors 900, 901 and 902, a calculation processing section 94, and driving circuits 96*p*, 96*t* and 96*r*.

The angular velocity sensors 900, 901 and 902 are attached to the base 200 of the camera driving apparatus or a camera unit main body (not shown) for fixing the base 200. The angular velocity sensors 900, 901 and 902 detect angular velocities around the axes represented with the chain lines in the figure. Specifically, the angular velocity sensors 900, 901 and 902 respectively detect the angular velocities in the panning direction 20, the tilting direction 21 and the rolling direction 22. FIG. 15 shows three independent angular velocity sensors 900, 901 and 902, but one angular velocity sensor capable of detecting angular velocities around the three axes may be used. The angular velocity sensors only need to detect angular velocities around three axes perpendicular to one another, and the three axes do not need to match the panning direction 20, the tilting direction and the rolling direction 22. In the case where the angular velocities detected by the angular velocity sensors are not the angular velocities around the panning direction 20, the tilting direction 21 and the rolling direction 22, the calculation processing section 94 can convert the obtained values into the angular velocities in the panning direction 20, the tilting direction 21 and the rolling direction 22.

For example, shake angles in the panning direction 20 and the tilting direction 21 caused by the camera-shake when a photo is taken are detected by the angular velocity sensors 900 and 901 respectively. A shake angle in the rolling direction 22 caused by a transfer of the walking balance when the photographer takes a photo while walking is detected by the angular velocity sensor 902. As shown in FIG. 16, information on the shake angles detected by the angular velocity sensors 900, 901 and 902 is output as angular velocity signals 80p, 80t and 80r respectively.

The angular velocity signals 80p, 80t and 80r are respectively converted into signals suitable for calculation processing to be performed by the calculation processing section 94. Specifically, the angular velocity signals 80p, 80t and 80r are input to analog circuits 91p, 91t and 91r to be deprived of a noise component and a DC drift component. Angular velocity signals 81p, 81t and 81r deprived of the noise component and the DC drift component are input to amplification circuits 92p, 92t and 92r, which respectively output angular velocity signals 82p, 82t and 82r having appropriate values. Then, these signals are converted into digital signals by A/D converters 93p, 93t and 93r, and the obtained digital signals 83p, 83t and 83r are input to the calculation processing section 94.

The calculation processing section 94 performs integration processing of converting the angular velocities into camera-shake angles, and thus sequentially calculates shake angles in the panning direction 20, the tilting direction 21 and the rolling direction 22. The calculation processing section 94 also performs three-axis shake compensation processing. The three-axis shake compensation processing performed by the calculation processing section 94 is an open loop control of driving the movable unit having the camera section 100 mounted thereon so as to suppress the angular velocities in accordance with the angular velocity signals 83p, 83t and 83r detected by the respective angular velocity sensors 900, 901 and 902. The calculation processing section sequentially outputs target rotating angle signals 84p, 84t and 84r as optimum digital shake compensation amounts in consideration of the frequency response characteristic, the phase compensation, the gain compensation and the like of the camera driving apparatus 151.

The target rotating angle signals 84p, 84t and 84r are converted into analog signals by the D/A converters 95p, 95t and 95r, and input to the driving circuits 96p, 96t and 96r as analog target rotating angle signals 85p, 85t and 85r.

Meanwhile, in the camera driving apparatus 151, the first and second magnetic sensors 501 and 503, for detecting the rotating angle of the movable unit having the camera section 100 mounted thereon with respect to the base 200, output rotating angle signals 86p, 86t and 86r in the panning direction 20, the tilting direction 21 and the rolling direction 22. The rotating angle signals 86p, 86t and 86r are deprived of a noise component and a DC drift component by analog circuits 97p, 97t and 97r and output as rotating angle signals 87p, 87t and 87r. From these signals, rotating angle signals 88p, 88t and 88r having appropriate output values are obtained by amplification circuits 98p, 98t and 98r. The rotating angle signals 88p, 88t and 88r are input to the driving circuits 96p, 96t and 96r.

The driving circuits 96p, 96t and 96r are formed of a feedback system of feeding the rotating angle signals 88p, 88t and 88r to the target angle signals 85p, 85t and 85r. Therefore, when no external force is applied to the camera unit 156, the driving circuits 96p, 96t and 96r control the angles of the movable unit having the camera section 100 mounted thereon in the panning direction 20, the tilting direction 21 and the rolling direction 22 such that the movable unit is at a prescribed angular position. Based on the target angle signals 85p, 85t and 85r and the rotating angle signals 88p, 88t and 88r, driving signals for driving the panning driving coils 301, the tilting driving coils 302 and the rolling driving coils 303 are output from the driving circuits 96p, 96t and 96r. Owing to this, the camera driving apparatus 151 executes a feedback control on the angular position, and the movable section 102 having the camera section 100 mounted thereon is driven such that the rotating angle signals 88p, 88t and 88r are equal to the target rotating angle signals 85p, 85t and 85r.

By this series of driving control, the shake compensation for the camera section 100 is made, and thus photography can be made stably even while the photographer is walking.

In this embodiment, a control system mainly using the rotating angle signals obtained by integrating the outputs from the angular velocity sensors is shown. It is also possible to detect rotating angle signals by inputting the rotating angle signals 88p, 88t and 88r from the first and second magnetic sensors 501 and 503 of the camera driving apparatus to the calculation processing section 94 via the A/D converter and performing differential processing. Owing to this, the calculation processing section 94 can further construct an angular velocity feedback system using the angular velocity signals 83p, 83t and 83r from the camera apparatus and the rotating angle signals from the camera section 100. Thus, the camera-shake and walk-shake can be suppressed at a higher precision.

A camera driving apparatus and a camera unit according to the present invention allow the camera section to rotate at a larger angle than a conventional camera-shake compensation device. Therefore, the present invention can also realize a camera driving apparatus capable of chasing a subject specified in an image such that the subject is located at the center of the image using image processing or the like.

In addition, photos can be taken while the camera section is rotated in the panning direction or the tilting direction. By sequentially synthesizing still images or moving images which have been taken, the camera driving apparatus according to the present invention realizes super-wide-angle photography of still images or moving images.

INDUSTRIAL APPLICABILITY

A camera driving apparatus according to the present invention includes a structure capable of performing driving in a panning direction, a tilting direction and a rolling direction, and therefore can compensate for three-axis shake including rolling shake which is caused by a transfer of the walking balance when the photographer takes a photo while walking. Thus, the present invention is preferably usable for various types of imaging devices which need to perform shake compensation of images, for example, wearable cameras. The camera driving apparatus according to the present invention is also suitable to cameras chasing a subject at a high speed, surveillance cameras, onboard cameras and the like which need to make high-speed panning, tilting and rolling motions.

The present invention also provides a video camera which is capable of performing super-wide-angle photography of still images and also moving images because a high-speed panning or tilting motion allows images which have been taken to be synthesized at a high speed.

REFERENCE SIGNS LIST

10 Optical axis
11, 12 Rotation axis
13, 17, 18 Straight line
20 Panning direction
21 Tilting direction
22 Rolling direction
50 Gap
100 Camera section
102 Movable section
102D, 102E, 102F, 102G Contact face
102C Contact face
165 Camera driving apparatus
170 Camera unit
180, 181, 181, 182, 183, 184, 185, 186 Direction
190 Electromagnetic force
200 Base
200K Opening
201 Fall preventive member
201A Fall preventive regulation section
202 Protrusion section
202A Sphere center
202F Opening
203, 204 Magnetic yoke
210 Coupling member
301, 302, 303, 700 Driving coil
401, 402 Driving magnet
403 Rotation detection magnet
404 Attracting magnet
501, 503 Magnetic sensor

The invention claimed is:

1. A camera driving apparatus, comprising:
a camera section including an imaging element having an imaging plane, a lens having an optical axis for forming an image of a subject on the imaging plane, and a lens barrel for holding the lens;
a fixed unit including a protrusion section formed of a magnetic member at least partially and having a shape of at least a part of a spherical face;
a movable unit for supporting the camera section, the movable unit including an attracting magnet for generating a magnetic attracting force for the magnetic member, and a conical contact face with which the protrusion section of the fixed unit is loosely engageable and contactable by the magnetic attracting force, the movable unit being freely pivotable with respect to a sphere center of the spherical face of the protrusion section;
a panning driving section for inclining the camera section with respect to the fixed unit in a panning direction;
a tilting driving section for inclining the camera section with respect to the fixed unit in a tilting direction which is perpendicular to the panning direction;
a rolling driving section for rotating the camera section with respect to the fixed unit in a rolling direction around the optical axis of the lens;
a detector for detecting an inclining angle of the camera section with respect to the fixed unit in the panning and tilting directions and a rotating angle of the camera section in the rolling direction; and
a fall preventive member including a fall preventive regulation section distanced from the movable unit by a prescribed gap in a direction of the optical axis, the fall preventive member being fixed to the fixed unit,
wherein the fall preventive member includes four fall preventive regulation sections;
the four fall preventive regulation sections are provided in the form of two pairs and extend toward the optical axis; and
the two pairs of fall preventive regulation sections are respectively located on two straight lines which are perpendicular to each other and have an angle of 45 degrees with respect to a rotation axis of inclination around which the movable unit is inclined in the panning direction and a rotation axis of inclination around which the movable unit is inclined in the tilting direction.

2. The camera driving apparatus of claim 1, wherein:
the panning driving section includes:
a pair of panning driving magnets located symmetrically with respect to the sphere center of the spherical face and fixed to the fixed unit; and
a pair of panning driving coils provided on the movable unit so as to respectively face the panning driving magnets;
the tilting driving section includes:
a pair of tilting driving magnets located symmetrically with respect to the sphere center of the spherical face and fixed to the fixed unit so as to be respectively perpendicular to the pair of panning driving magnets; and
a pair of tilting driving coils provided on the movable unit so as to respectively face the tilting driving magnets; and
a position of each of the panning driving magnets, the tilting driving magnets, the panning driving coils and the tilting driving coils in the direction of the optical axis approximately matches a position of the sphere center of the spherical face.

3. The camera driving apparatus of claim 2, wherein:
the panning driving section includes a pair of panning magnetic yokes provided on the movable unit, inner to the pair of panning driving coils; and
the tilting driving section includes a pair of tilting magnetic yokes provided on the movable unit, inner to the pair of tilting driving coils.

4. The camera driving apparatus of claim 3, wherein:
the rolling driving section includes four rolling driving coils;
each of the rolling driving coils is located so as to bridge a side face, of one of the panning driving coils, which faces the corresponding panning driving magnet and a side face, of one of the tilting driving coils, which faces the corresponding tilting driving magnet and also so as to overlap a part of the one of the panning driving coils and a part of the one of the tilting driving coils; and
the rolling driving section includes the four rolling driving coils, the panning driving magnets and the tilting driving magnets.

5. The camera driving apparatus of claim 4, wherein the panning magnetic yokes and the tilting magnetic yokes each act also as a rolling magnetic yoke.

6. The camera driving apparatus of claim 2, wherein:
the pair of panning driving magnets are magnetized oppositely to each other on a straight line which is on a plane perpendicular to the optical axis of the lens and passes the sphere center;

the pair of tilting driving magnets are magnetized oppositely to each other on a straight line which is on a plane perpendicular to the optical axis of the lens and passes the sphere center; and each one of the panning driving magnets and each one of the tilting driving magnets, which are adjacent to each other at an interval of 90 degrees, are magnetized oppositely to each other with respect to the sphere center on a circumference of a circle which is on a plane perpendicular to the optical axis and is centered around a point at which the optical axis crosses the plane.

7. The camera driving apparatus of claim 6, wherein each of the panning driving coils and a corresponding one of the tilting driving coils are symmetrical with respect to a plane which is perpendicular to the optical axis of the lens and includes the sphere center; the panning driving coils and the tilting driving coils each have a generally V-shaped cross-section on a plane including the optical axis; and the panning driving coils and the tilting driving coils are each located such that a trough portion of the V-shaped cross-section faces the optical axis of the lens.

8. The camera driving apparatus of claim 2, wherein the pair of panning driving magnets and the pair of tilting driving magnets each have a side face which has a shape of a part of a recessed spherical face having a center matching the sphere center of the spherical face.

9. The camera driving apparatus of claim 1, wherein the detector includes a first detection section for detecting an inclining angle of the camera section with respect to the fixed unit in the panning and tilting directions, and second detection sections for detecting a rotating angle of the camera section in the rolling direction.

10. The camera driving apparatus of claim 9, wherein:
the first detection section includes a first magnetic sensor fixed to the fixed unit; and
the first magnetic sensor detects a change of a magnetic force caused by inclination of the attracting magnet provided in the movable unit and calculates a two-dimensional inclining angle of the camera section in the panning and tilting directions.

11. The camera driving apparatus of claim 10, wherein the first magnetic sensor is provided at a tip of, or inside, the protrusion section of the fixed unit.

12. The camera driving apparatus of claim 9, wherein:
the second detection sections are located symmetrically with respect to the sphere center on a plane which is perpendicular to the optical axis of the lens and passes the sphere center; and
the second detection sections are located at an angle of 45 degrees with respect to the panning driving section or the tilting driving section when seen in the direction of the optical axis of the lens in the case where the movable unit is at a neutral position.

13. The camera driving apparatus of claim 9, wherein:
the second detection sections include a pair of second magnetic sensors fixed to the fixed unit and a pair of rotation detection magnets provided on the movable unit; and
the pair of second magnetic sensors detect a change of a magnetic force caused by rotation of the rotation detection magnets and calculate a rotating angle of the camera section.

14. The camera driving apparatus of claim 13, wherein the pair of second magnetic sensors are located symmetrically with respect to the sphere center on a straight line which is on a plane perpendicular to the optical axis of the lens and passes the sphere center, and the pair of rotation detection magnets are located symmetrically with respect to the sphere center on a straight line which is on a plane perpendicular to the optical axis of the lens and passes the sphere center.

15. The camera driving apparatus of claim 13, wherein the pair of rotation detection magnets each include two magnetic poles, magnetized oppositely to each other, on a straight line which is on a plane perpendicular to the optical axis of the lens and passes the sphere center, and the two magnetic poles are located on a circumference of a circle centered around the optical axis on the plane perpendicular to the optical axis.

16. The camera driving apparatus of claim 13, wherein the pair of second magnetic sensors are provided on the protrusion section of the fixed unit.

17. The camera driving apparatus of claim 1, further comprising a viscous member or a viscous fluid provided between the contact face of the movable unit and the protrusion section of the fixed unit.

18. The camera driving apparatus of claim 1, wherein the attracting magnet is located on the optical axis of the lens in the movable unit and is magnetized in the direction of the optical axis.

19. The camera driving apparatus of claim 1, wherein the gap is determined such that the contact face of the movable unit, even when being separated from the protrusion section of the fixed unit, is returned to a contact state by the magnetic attracting force of the attracting magnet.

20. A camera unit, comprising:
the camera driving apparatus of claim 1;
angular velocity sensors respectively for detecting angular velocities around three axes of the fixed unit which are perpendicular to one another; and
a calculation processing section for generating a target rotation angle signal based on outputs from the angular velocity sensors, and a driving circuit for generating a signal for driving the panning driving section and the tilting driving section based on the target rotation angle signal.

* * * * *